(12) United States Patent
Rentzhog et al.

(10) Patent No.: US 10,609,872 B2
(45) Date of Patent: Apr. 7, 2020

(54) POT DEVICE AND METHOD RELATED THERETO

(71) Applicant: Plantagon International AB, Stockholm (SE)

(72) Inventors: Mikael Lennart Rentzhog, Stockholm (SE); Jan Axel Rylenius, Stockholm (SE)

(73) Assignee: PLANTAGON INTERNATIONAL AB, Stockholm (SE)

( * ) Notice: Subject to any disclaimer, the term of this patent is extended or adjusted under 35 U.S.C. 154(b) by 660 days.

(21) Appl. No.: 14/901,277

(22) PCT Filed: Jun. 26, 2014

(86) PCT No.: PCT/SE2014/050794
§ 371 (c)(1),
(2) Date: Dec. 28, 2015

(87) PCT Pub. No.: WO2014/209214
PCT Pub. Date: Dec. 31, 2014

(65) Prior Publication Data
US 2016/0150740 A1    Jun. 2, 2016

(30) Foreign Application Priority Data

Jun. 26, 2013 (SE) ...................... 1350775

(51) Int. Cl.
*A01G 9/02* (2018.01)
(52) U.S. Cl.
CPC .................... *A01G 9/028* (2013.01)
(58) Field of Classification Search
CPC .......... A01G 7/025; A01G 9/02; A01G 9/021; A01G 9/042; A01G 9/088; A01G 9/108;
(Continued)

(56) References Cited

U.S. PATENT DOCUMENTS

| 77,662 | A | * | 5/1868 | Scotton | A01G 13/0243 |
| | | | | | 47/32.4 |
| 589,896 | A | * | 9/1897 | Jarboe | A47G 33/12 |
| | | | | | 248/524 |

(Continued)

FOREIGN PATENT DOCUMENTS

| CN | 2291865 Y | 9/1998 |
| CN | 201839655 U | 5/2011 |

(Continued)

OTHER PUBLICATIONS

International Search Report of the International Searching Authority issued in the corresponding PCT International Application No. PCT/SE2014/050794, dated Sep. 17, 2014, 5 pages.

(Continued)

*Primary Examiner* — Christopher D Hutchens
(74) *Attorney, Agent, or Firm* — Birch, Stewart, Kolasch & Birch, LLP

(57) ABSTRACT

The present invention relates to a pot device having an external frame for holding a pot inside the frame. The frame has a lower end constituting a support base. The pot device includes connection means arranged for connecting the frame to the pot. The connection means has locking means arranged for locking the pot in an upright position. According to the invention, the extension of the frame in a horizontal plane is adjustable. The diameter of the frame in a horizontal plane is variably adjustable and the frame includes a plurality of circumferentially distributed sections. These sections are telescopically connected to each other in the circumferential direction.

Figure 1:
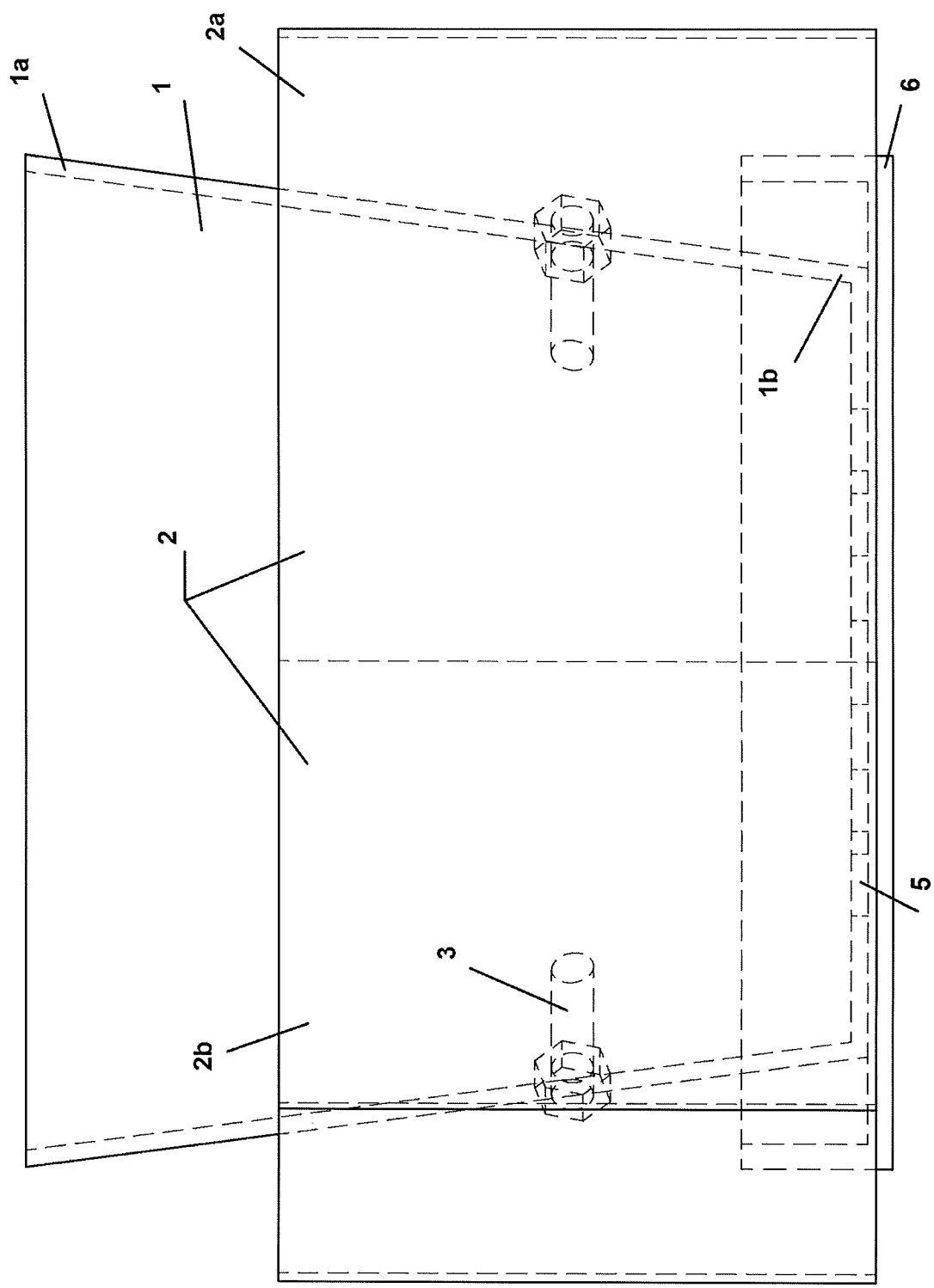

The invention further relates to the use of said pot device in a method for transporting a plurality of pots devices on a conveyor system wherein each pot device houses at least one plant, Moreover, the invention also relates to a method for (Continued)

transporting a plurality said pots devices on a conveyor system wherein each pot device houses at least one plant.

22 Claims, 18 Drawing Sheets

(58) Field of Classification Search
CPC .......... A01G 9/12; A01G 17/12; A01G 17/14; A01G 31/042; A01G 9/026; A01G 9/028; A01G 2009/003; A01G 13/0243; A47G 7/025; A47G 33/12; A47G 2007/066; A47G 2033/122; A47G 2033/1233; A47G 2033/124; A47G 2033/1253; A47G 7/07
USPC .......... 248/149, 176.3, 188.7, 346.07; 47/46, 47/66.1

See application file for complete search history.

(56) References Cited

U.S. PATENT DOCUMENTS

| | | | | |
|---|---|---|---|---|
| 1,056,669 A | | 3/1913 | Harris | |
| 1,337,803 A | * | 4/1920 | Stanley | A01G 9/12 47/47 |
| 1,830,769 A | * | 11/1931 | Rothermel | A47G 7/025 248/154 |
| 2,410,227 A | * | 10/1946 | Matthews | A47G 33/12 248/524 |
| 3,144,233 A | * | 8/1964 | Pelley | B65F 1/1421 248/154 |
| 3,838,838 A | * | 10/1974 | Seaman, Jr. | A47G 33/12 248/188.7 |
| 4,848,027 A | * | 7/1989 | Skierwiderski | A01G 17/14 248/523 |
| 5,002,252 A | * | 3/1991 | Setala | A47G 33/12 248/523 |
| 5,014,461 A | * | 5/1991 | von Braucke | A47G 33/12 248/523 |
| 5,157,869 A | * | 10/1992 | Minton | A01G 9/02 220/4.21 |
| 5,560,578 A | * | 10/1996 | Schenken | B60N 3/101 248/229.21 |
| 5,603,474 A | * | 2/1997 | Weber | B25H 1/10 248/127 |
| 6,082,301 A | * | 7/2000 | Kramer | A01K 5/0142 119/61.53 |
| 6,227,513 B1 | | 5/2001 | Richard | |
| 7,607,629 B1 | * | 10/2009 | Carrasco | A61J 9/06 248/102 |
| 9,115,502 B2 | * | 8/2015 | Garcia | E04G 13/00 |
| 2002/0130242 A1 | | 9/2002 | Thurner | |
| 2009/0236479 A1 | * | 9/2009 | Rose | A47B 97/00 248/188.7 |

FOREIGN PATENT DOCUMENTS

| | | |
|---|---|---|
| CN | 201967451 U | 9/2011 |
| CN | 202069296 U | 12/2011 |
| CN | 202222238 U | 5/2012 |
| CN | 102972228 A | 3/2013 |
| JP | 61-152252 U | 9/1986 |
| JP | 9-299209 A | 11/1997 |
| JP | 3062275 U | 9/1999 |

OTHER PUBLICATIONS

Japanese Office Action, dated Apr. 24, 2018, for Japanese Application No. 2016-523700.

* cited by examiner

POT DEVICE AND METHOD RELATED THERETO

FIELD OF INVENTION

The present invention relates to a pot device having an external frame for holding a pot inside the frame. The frame has a lower end constituting a support base, and the pot device includes connection means arranged for connecting the frame to the pot wherein the connection means has locking means arranged for locking the pot in an upright position. The diameter of the frame in a horizontal plane is variably adjustable and the frame includes a plurality of circumferentially distributed sections. These sections are telescopically connected to each other in the circumferential direction.

The invention further relates to the use of said pot device in a method for transporting a plurality of pots devices on a conveyor system wherein each pot device houses at least one plant. Moreover, the invention also relates to a method for transporting a plurality said pots devices on a conveyor system wherein each pot device houses at least one plant.

BACKGROUND OF INVENTION

In large scale and commercial agriculture, horticulture, farming and greenhouse industry, certain types of pots are required to hold soil and water for growing plants. During the period of rooting, cuttings or starting seeds, there is not much space required for arranging a plurality of such pots. In fact, these pots can be placed very closely to each other. On the other hand, when the plants grow bigger, a prescribed spacing among adjacent plants is required to provide optimum air and light so as to assure better growing of the plants.

Additionally, when plants grow and become taller and wider, the pots have to be replaced with bigger ones in order to enhance the growth of the plants. However, replacing pots does not hinder potted plants from tipping over since pots on their own neither lower the center of gravity nor offer necessary support for stabilizing the pot.

Moreover, plants that are potted outdoors are prone to tipping due to wind, rain, snow and other elements of nature. The tipping of potted plants is even a big problem when pots are transported in vehicles or are placed on conveyor systems where the pots are being moved backward and forward, right and left, or upward or downward. Moreover, pots that are transported side by side, in either vehicles or on conveyor systems, tend to collide which each other, and as a result the parts of the plants which protrude from the pots become damaged and the plant becomes useless.

A bigger problem in conveyor systems is that very large loads are exerted on the pots when they are placed on a surface which does not move and wherein the pots are instead being transported forwards by a mechanical device (such as a bar or arm) which is collectively pushing the pot devices over said surface. Such conveyor system are e.g. systems where a plurality of pots are placed in a conveyor comprising water and wherein the pots are pushed over the surface of the conveyor by an arm or bar which is pushing/herding all of the pots at the same time. However, the pots in the prior art are not designed to withstand these heavy loads, and consequently, the pots become deformed, damaged and unusable over time and are therefore discarded. Hence, there is a need to provide a pot device which is stable and can withstand heavy loads in conveyor systems, as well as other transport systems, where a plurality of pot devices is being subjected to large loads, i.e. large forces, deformations, or accelerations applied to the pot devices.

Furthermore, in large scale agriculture, horticulture, farming and greenhouse industry, pots have to be exchanged often since the plants grow fast when they are provided with optimal levels of sunlight, heat and nutrients. However, devices that can stabilize and protect plants, and also hold various sizes of pots, are not available.

PRIOR ART

U.S. Pat. No. 5,022,183 concerns a tray for retaining a flower pot having a pot bottom with drain holes. The tray has a planar bottom wall for supporting the pot bottom and restrains the pot from moving parallel to the plane of the tray bottom wall. A protrusion is formed in the tray bottom wall in registration with a pot drain hole. The protrusion has a transverse lip adapted to overlie the pot bottom and restrains transverse movement relative to the plane of the tray bottom wall.

US2005235557 relates to a device for covering the space between a top container rim of an inner plant growing container and the inside wall of an outer decorative container in which the inner plant growing container is placed, includes a plurality of arcuate pieces pivotally joined end to end, the device having opposite unconnected ends. The arcuate pieces are joined in a manner so that the device can be adjustably moved into ring configurations of different diameters to approximately fit within the inner wall of the decorative outer container and rest on the top rim of the inner growing container. Clips or tabs extend downwardly from the device to cooperate with the top rim of the inner container to hold the pieces from moving inwardly, thereby maintaining the adjusted diameter of the device and holding the device in position on top of the inner container.

JP7255578 discloses a flowerpot support that prevents tipping of potted plants. A peripheral edge is formed around the outer periphery of the bottom of a pot support portion molded from plastic and having a window in its perimeter wall in the form of an inverted truncated cone holding the outer periphery of the bottom of a flowerpot, and an annular metallic weight is inserted around the outer periphery of the peripheral edge, and three legs are projected from the outer periphery of the bottom surface of the peripheral edge, and the flowerpot can be prevented from tipping over by the combined effect of lowering the center of gravity by means of the weight and supporting the flowerpot stably with the legs that enlarge the point of support.

One of the disadvantages with the embodiments disclosed in the above mentioned prior art documents is that they neither maximize the effective use of the growing space nor provide optimum spacing between plant growing containers. Moreover, a plant can easily tip over once the plant has grown beyond the capacity of the pot to lower the center of gravity. A further disadvantage is that, the prior art embodiments do not offer necessary support for stabilizing pots transported in vehicles or moved on a conveyor systems. A yet further disadvantage is that, the prior art embodiments cannot hinder parts of the plants which protrude from the pots to become damaged when pots collide during transport or conveying.

However, the biggest disadvantage of the pots in the prior art is that they are not suitable for being transported on conveyor systems since they are not designed to withstand large loads applied to the pots. Hence, the prior art pots are not able to withstand forces, deformations, or accelerations applied to said pot.

Hence, there is a need for pots which can provide adjustable spacing between a plurality of pots. Moreover, there is a need for adjustable pots which can support various sizes of potted plants from tipping over and at the same time hindering the said potted plants from being damaged when they collide with each other during either transport in vehicles or movement on conveyor systems. But most importantly, there is a need to provide a pot device which is stable and can withstand heavy loads in conveyor systems.

SUMMARY OF INVENTION

The object of the present invention is to provide a device that (i) maximizes the effective use of the growing space and provides optimum spacing, (ii) stabilizes various sizes of plants in pots so that the potted plants do not tip over, (iii) hinders plants from getting damaged when the pots collide during transport or conveying, and (iv) enables the pot device to withstand large loads, i.e. enables the pot device to withstand forces, deformations, or accelerations applied to the pot device According to the invention, this object is attained in that a pot device of the kind specified in the preamble of claim 1 includes the specific feature in that the extension of the frame in a horizontal plane is adjustable.

Thus the pot device is provided with an external frame which is adjustable in a horizontal plane, i.e. the pot device is provided with an external frame wherein the diameter of the frame is variably adjustable. This allows the frame to be widened when the plant grows in order to stabilize the potted plant and also to hinder plants from colliding with each other during transport or conveying.

According to a preferred embodiment, the frame is formed as a closed loop as seen in a horizontal plane. This minimizes the risk of pot devices from locking into each other.

According to a further preferred embodiment, the closed loop is substantially circular. This allows the pot device to be stable in all directions.

According to a further preferred embodiment, the frame includes a plurality of circumferentially distributed sections. This facilitates the extension of the frame to be adjusted in a horizontal plane.

According to a further preferred embodiment, the frame comprises at least two sections, preferably three or four sections. A frame made from a single section is less stable than a frame with at least two sections. Similarly, a frame with three or four section is more stable than a frame with fewer sections. One reason for the instability in a frame with a single section is that the frame acquires an oval shape when the diameter is increased. The oval structure of the frame has several disadvantages such as the number of pots that can be placed on the conveyor system is decreased due to non-optimal distribution of pots.

According to a further preferred embodiment, the frame comprises four sections since there are several advantages with having four sections. One of the advantages is that the frame has a circular shape over the whole range of diameters of the frame. Pot devices with circular shaped frames result in fewer entanglements of pot devices when transported in conveying systems. A further advantage is that a frame with four sections can withstand a heavier load than a frame with two or three sections since the load is distributed over four sections instead of fewer sections. Moreover, a frame with four sections can withstand a heavier load without being deformed. A frame which is deformed loses its circular shape which results in several disadvantages such as (a) difficulties in adjusting the diameter of the frame, (b) yielding of the material in one or more sections, and/or (c) entanglement with other deformed pot devices when transported in conveying systems.

According to a further preferred embodiment, the sections are telescopically connected to each other in the circumferential direction. This allows simple means of moving the sections against or away from each other in order to adjust the diameter of the frame.

According to a further preferred embodiment, the connection means includes a plurality of connection units, wherein each of the connection units is perpendicularly attached to each of the sections, and wherein the attachment point is preferably centered in in the horizontal direction of each section. This allows a stable connection of frame and pot. Preferably, for an optimal stabilization of the pots, the number of connection units is three to five, preferably four. More than five connection units would complicate the device.

According to a further preferred embodiment, the pot comprises a plurality of channels, preferably four channels, at the lower end of the pot, and wherein said channels are preferably perpendicular relative to each other, and wherein the channels have the length and breadth to receive the connection units of the sections. Consequently, the channels and their corresponding connection units are dimensioned to fit each other as well as to give a stable support. More importantly, since each of the connection units can go in and out of the channels, the diameter of the frame can be variably adjusted.

According to a further preferred embodiment, each of the sections comprises a clamp at one end, and a flap at the other end, wherein each section is designed to clamp the flaps of the adjacent section. This feature allows the sections of the frame to be telescopically connected to each other. The definition of clamp in the present invention is a device used to join, grip, support or compress mechanical or structural parts.

According to a further preferred embodiment, the locking means comprises a cylindrical circular ring which has a diameter bigger than the pot (at the level of the pot where the rings is arranged) but smaller than the minimum diameter of the frame; i.e. the locking means is arranged in between the pot and the frame. Furthermore, the locking means is arranged (i.e. placed on the connection unit) so that its center overlaps with the center of the pot and frame. Importantly, the lower end of the locking means is arranged to be in contact with the connection units so that the locking means and the connection units together constitute the connection means, and wherein said connection means is the means for connecting the frame to the pot. It is important to note that the locking means does not only function as a means for locking the connection units in place, but it also functions as a stress, load and force absorbing means. The ring is hence responsible for the pot device being able to withstand large loads, i.e. forces, deformations, or accelerations applied to the pot device. Cylinder (i.e. noun version of cylindrical) is in the present invention defined as a solid consisting of two parallel planes bounded by identical closed curves, usually circles, that are interconnected at every point by a set of parallel lines, usually perpendicular to the planes. The cylindrical ring of the present invention preferably comprises an altitude (i.e. height) of 0.3-20 cm, preferably 1-10 cm, more preferably 2-5 cm.

According to a further preferred embodiment of the above embodiment, the upper end of the locking means comprises a circumferentially extending handle wherein said handle is perpendicular to the part of the locking means that fits with the connection units. The handle provides means for a person or a device to lift and/or press down the locking means.

According to a further preferred embodiment, the upper end of the connection units is preferably formed as a saw-tooth so that the upper end of the connection unit comprises a toothed, jagged and/or zigzag pattern or profile. The saw-tooth profile enables the locking means to stably and securely connect with the connection units, and thereby connecting and locking the frame to the pot. The term toothed is in this context defined as a having rectangular, quadratic, triangular and/or trapezoid shaped projections or indentations on the top surface of the connection units According to a further preferred embodiment, the variable adjustment of the diameter of the frame comprises the steps of:
 a. moving the sections outwards, away from the center of the pot, wherein the diameter of the frame is increased, or
 b. moving the sections inwards, towards the center of the pot, wherein the diameter of the frame is increased,
wherein said moving preferably involves directly or indirectly pushing, pulling and/or screwing of the connection units and/or sections, more preferably said moving involves directly or indirectly (i) pushing and pulling of the sections, and (ii) screwing of the connection units.

According to a further preferred embodiment, the variable adjustment of the diameter of the frame comprises the steps of:
 a. lifting the locking means, and
 b. pulling the sections outwards, away from the center of the pot, and optionally, simultaneously from below pulling the connection units outwards from the center of the pot, or
 c. pushing the sections inwards, towards the center of the pot, and optionally, simultaneously from below pushing the connection units inwards towards the center of the pot.

According to a further preferred embodiment, the part of the locking means in contact with the connection units is designed as one turn of a screw thread and the parts of the connection units in contact with the locking means are designed as sections of a screw thread.

According to a further preferred embodiment, the upper end of the locking means comprises a circumferentially extending handle wherein said handle is perpendicular to the part of the locking means that locks the connection units. The handle provides means for a person or a device to turn the locking means, and wherein said means is preferably a saw-tooth profile facilitating the gripping and turning of the locking means in either direction. The saw-tooth profile preferably comprises a toothed, jagged and/or zigzag profile.

According to a further preferred embodiment, the locking means comprises a cylindrical sleeve which the pot is placed in, and a cylindrical ring integrated with said cylindrical sleeve and arranged so that said ring is in contact with the connection units.

According to a further preferred embodiment, the variable adjustment of the diameter of the frame in the above two embodiments is attained by turning the locking means around the pot which results in the connection unit being variably screwed outwards or inwards out of the channels of the pot which results in the sections being moved outwards or inwards, respectively.

According to a further preferred embodiment, the turning of the locking means is enabled by an electromagnetic or electrical device included in the pot device. The variable adjustment is thus attained without the involvement of a person or an external device.

According to a further preferred embodiment, the sleeve comprises ribs on the outer surface. The function of the ribs is to facilitate supporting, gripping and turning of the locking means.

According to a further preferred embodiment, the pot device further includes a pot. This allows the pot device to maintain a growing plant.

According to a further preferred embodiment, the rim of the pot comprises a handle for facilitating gripping the rim of the pot.

According to a further preferred embodiment, the handle comprises ribs in order to provide a more effective means of gripping the handle.

According to yet another preferred embodiment, the pot device is characterized in that the size of the included pot is adjustable. This makes it unnecessary to repot plants.

The preferred embodiments are specified in the dependent claims.

A further object of the present invention is to provide method for variably adjusting the diameter of a pot device which (i) maximizes the effective use of the growing space and provides optimum spacing, (ii) stabilizes various sizes of plants in pots so that the potted plants do not tip over, (iii) hinders plants from getting damaged when the pots collide during transport or conveying, and (iv) enables the pot device to withstand large loads, i.e. withstand forces, deformations, or accelerations applied to the pot device.

According to a preferred embodiment, said method comprises the steps of:
 a. moving the sections outwards, away from the center of the pot, wherein the diameter of the frame is increased, or
 b. moving the sections inwards, towards the center of the pot, wherein the diameter of the frame is increased,
wherein said moving preferably involves directly or indirectly pushing, pulling and/or screwing of the connection units and/or sections.

According to a further preferred embodiment, said method comprises the steps of:
 a. lifting the locking means,
 b. pulling the sections outwards, away from the center of the pot, and optionally, simultaneously from below pulling the connection units outwards from the center of the pot, and
 c. pushing the sections inwards, towards the center of the pot, and optionally, simultaneously from below pushing the connection units inwards towards the center of the pot.

According to a further preferred embodiment, said method comprises the step of turning the locking means around the pot which results in the connection unit being variably screwed outwards or inwards out of the channels of the pot which results in the sections being moved outwards or inwards, respectively.

The preferred embodiments are specified in the dependent claims.

A further object of the invention is to use a pot device according to the above preferred embodiments in a method for transporting a plurality of pots on a conveyor system wherein each pot houses at least one plant.

A further object of the present invention is to provide a method for transporting a plurality of pot devices according to the above preferred embodiments on a conveyor system wherein each pot housing at least one plant.

DRAWINGS

Figure 2:
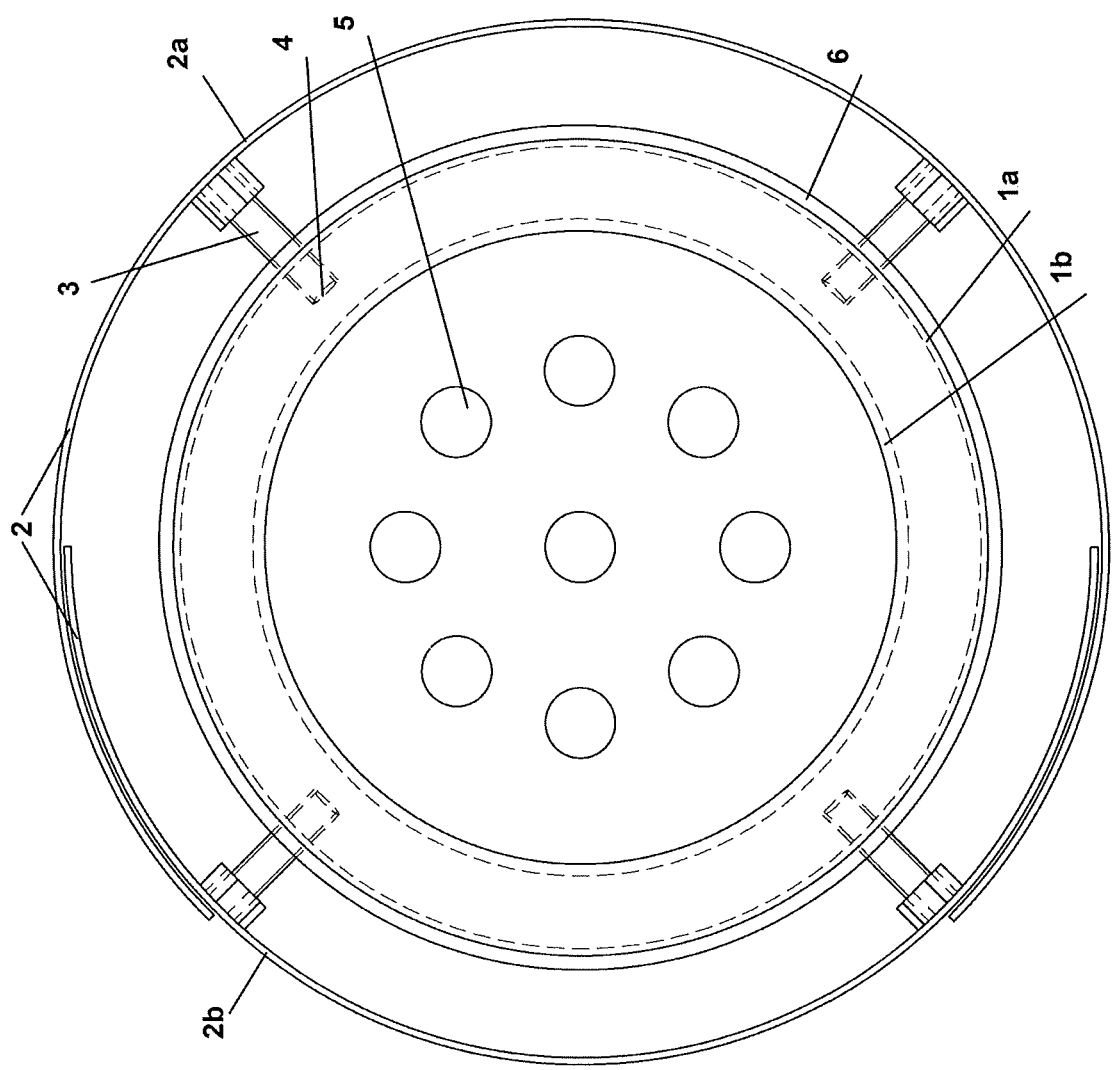
Figure 3:
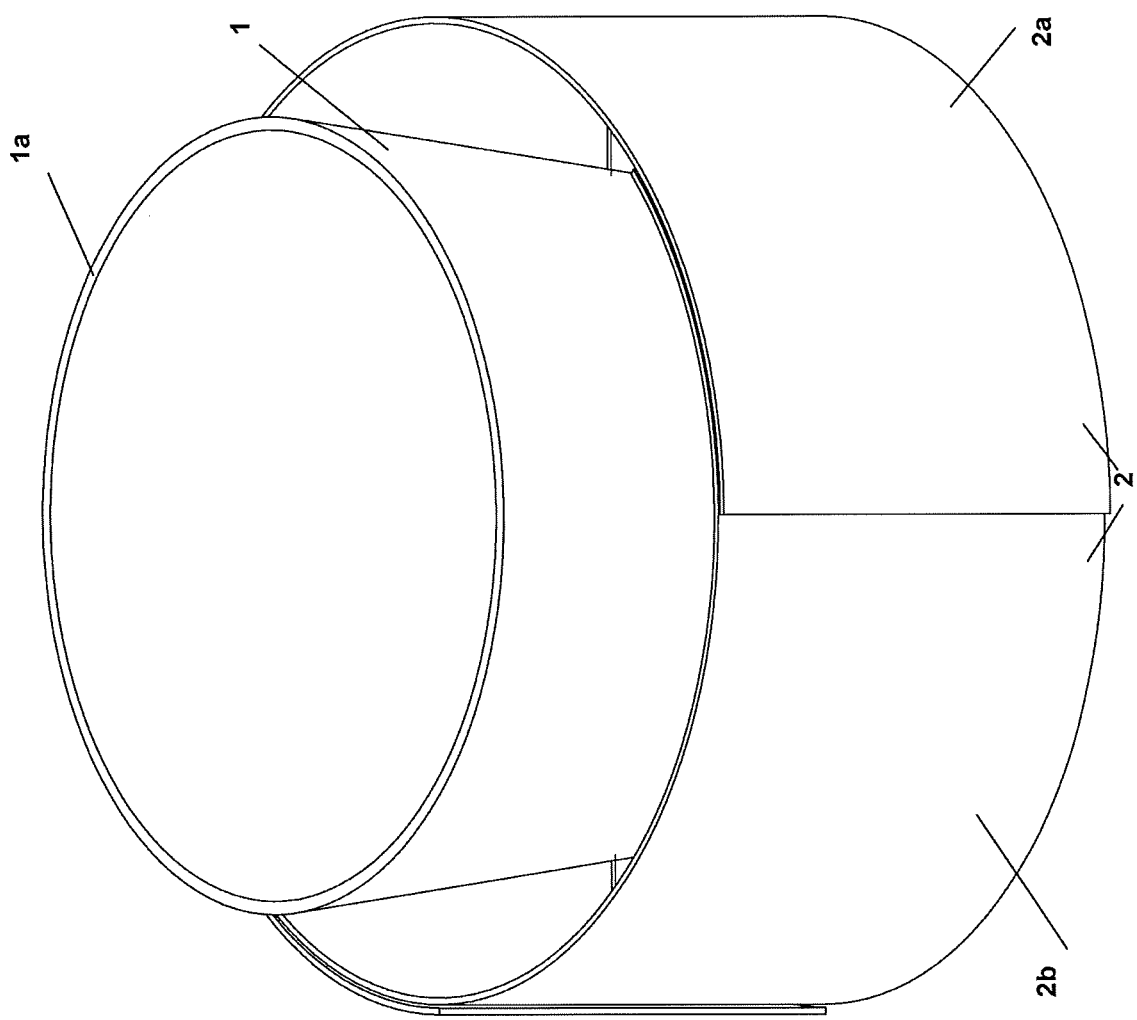
Figure 4:
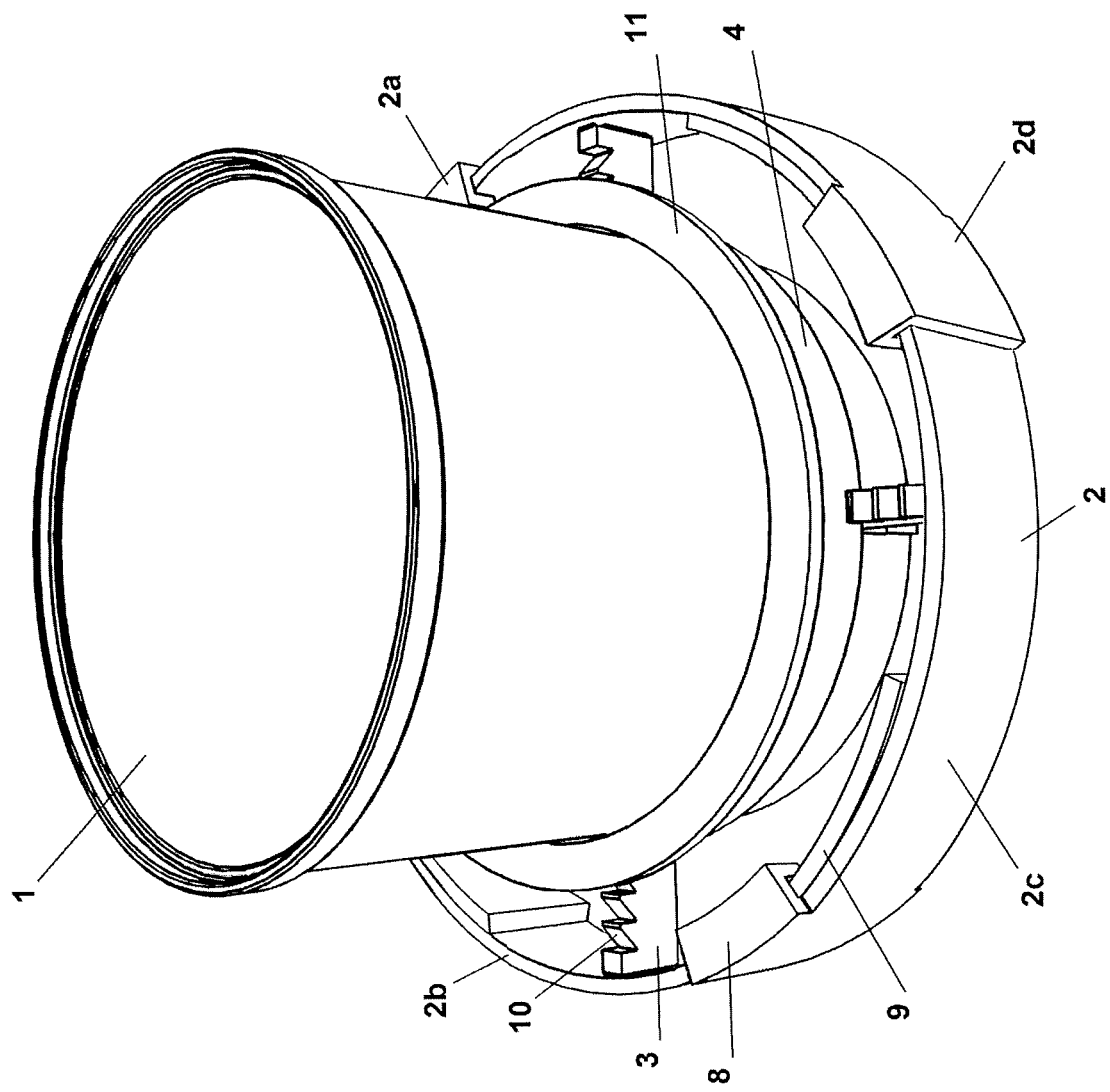
Figure 5:
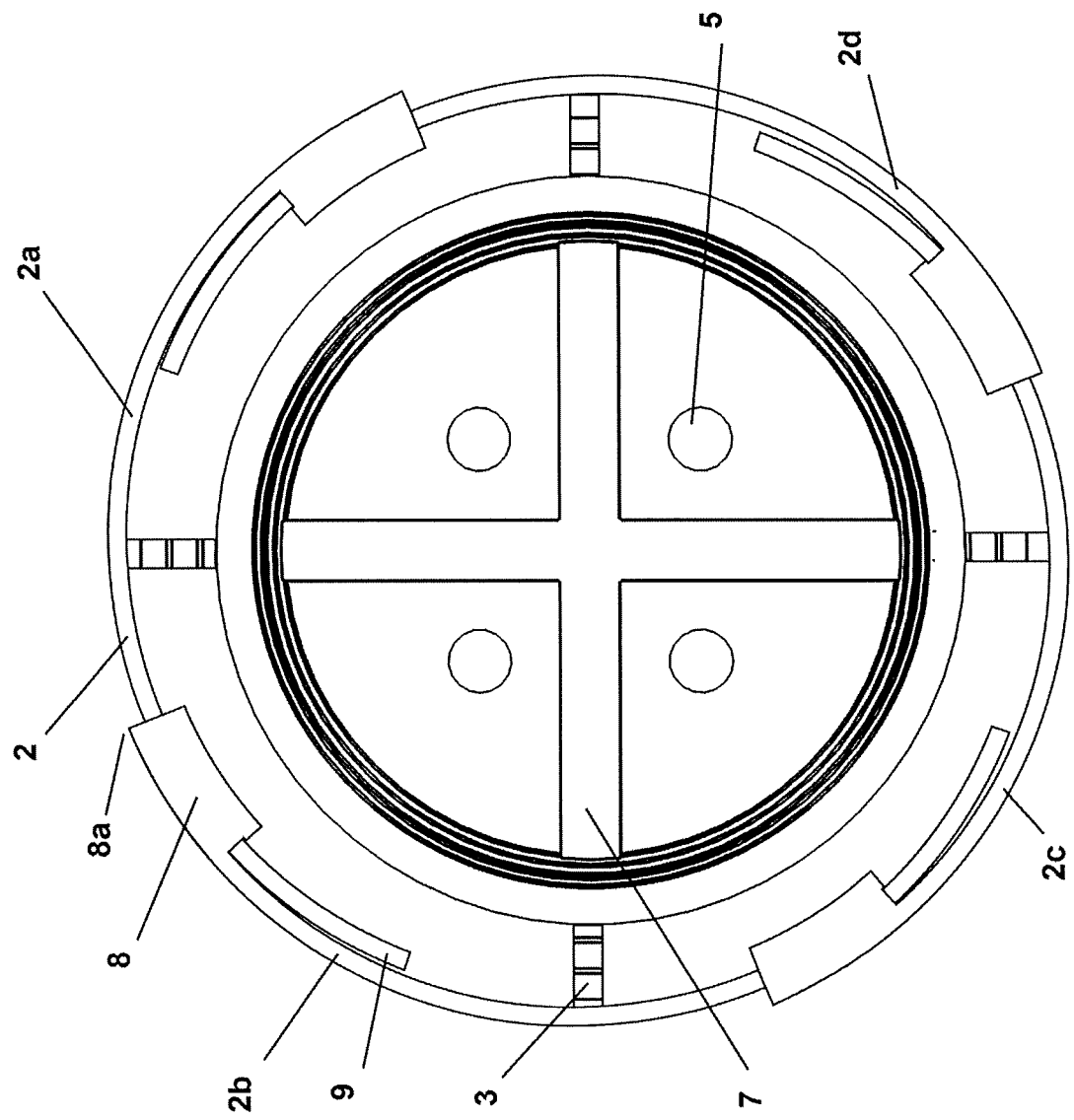
Figure 6:
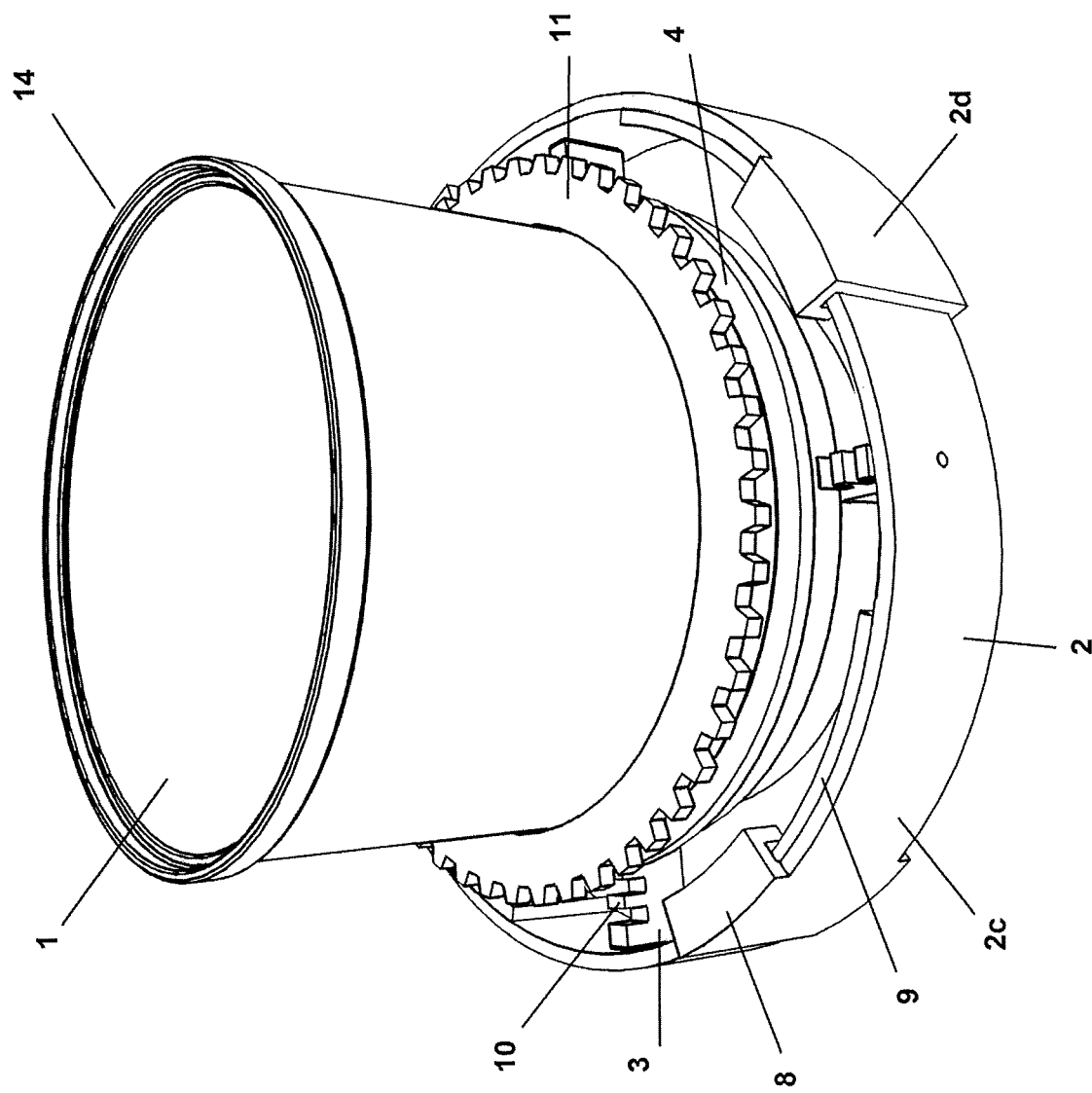
Figure 7:
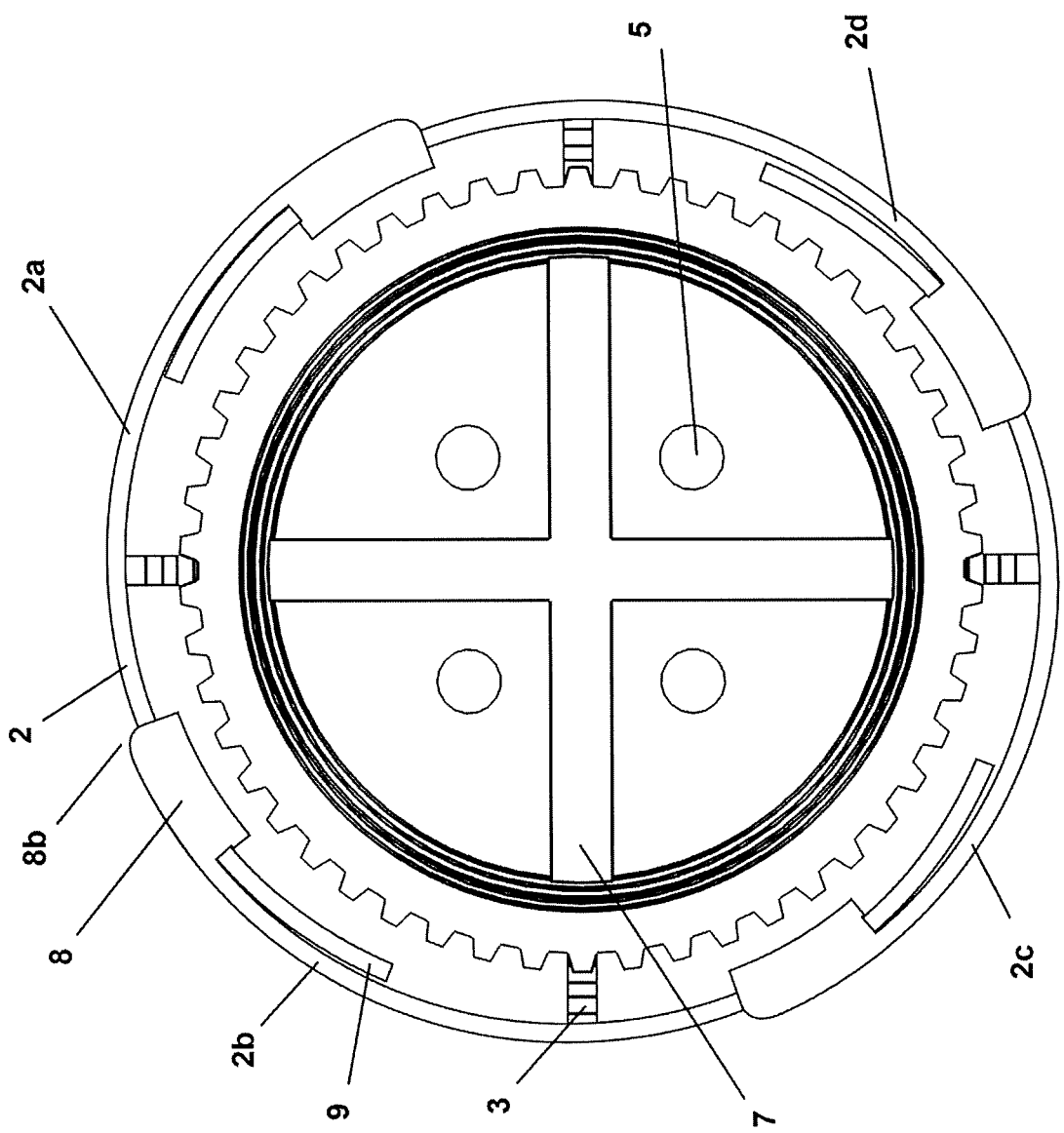
Figure 8:
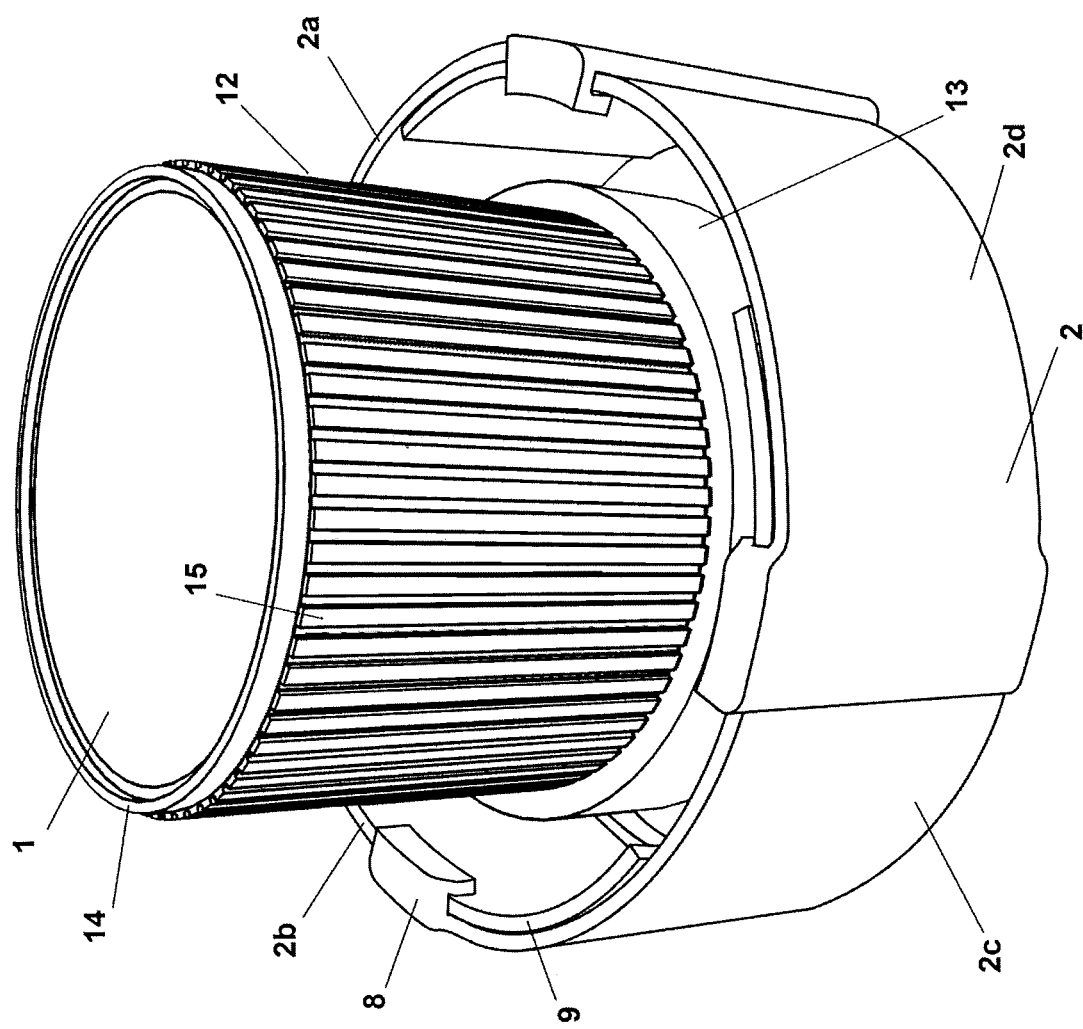
Figure 9:
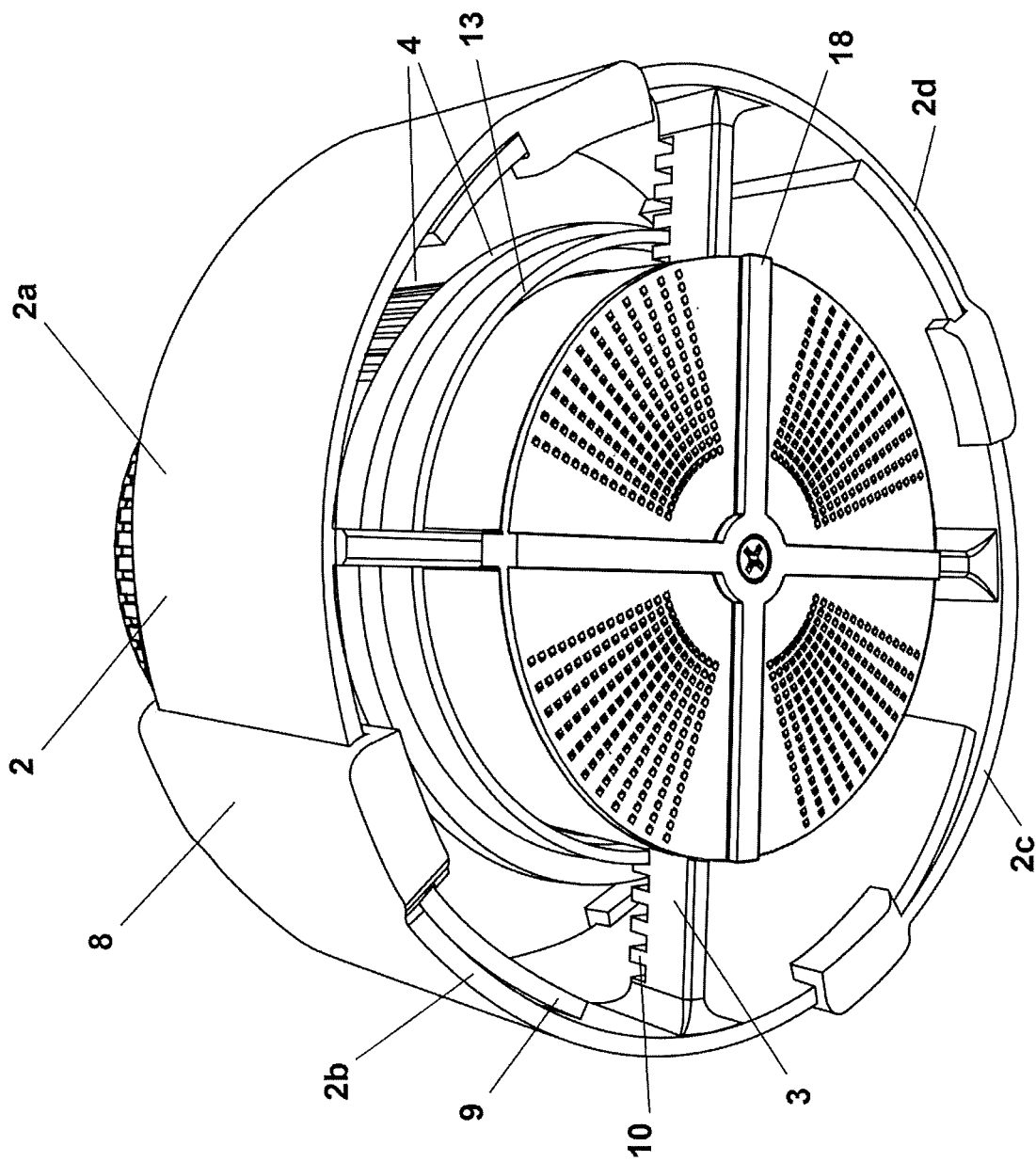
Figure 10:
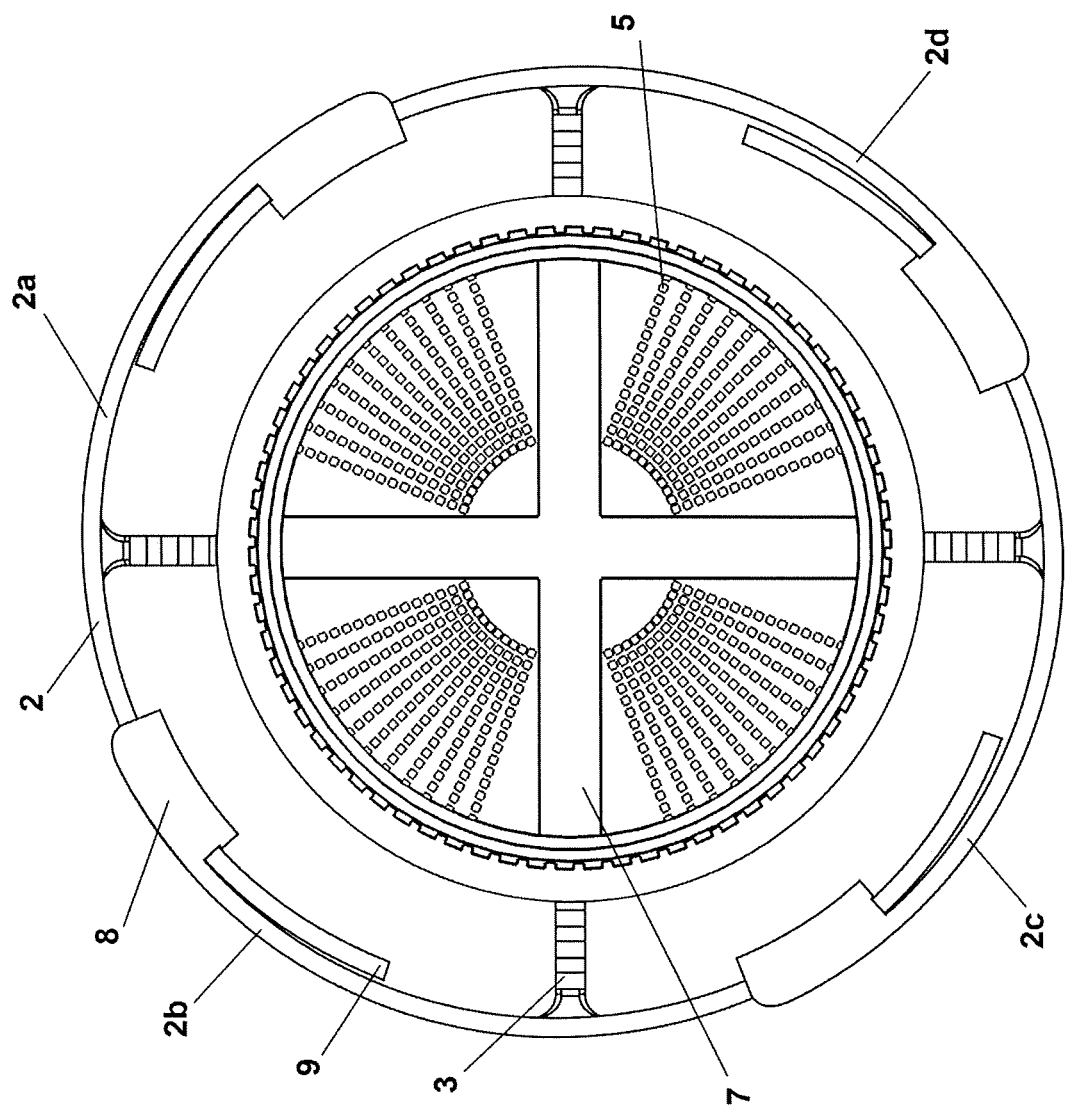
Figure 11:
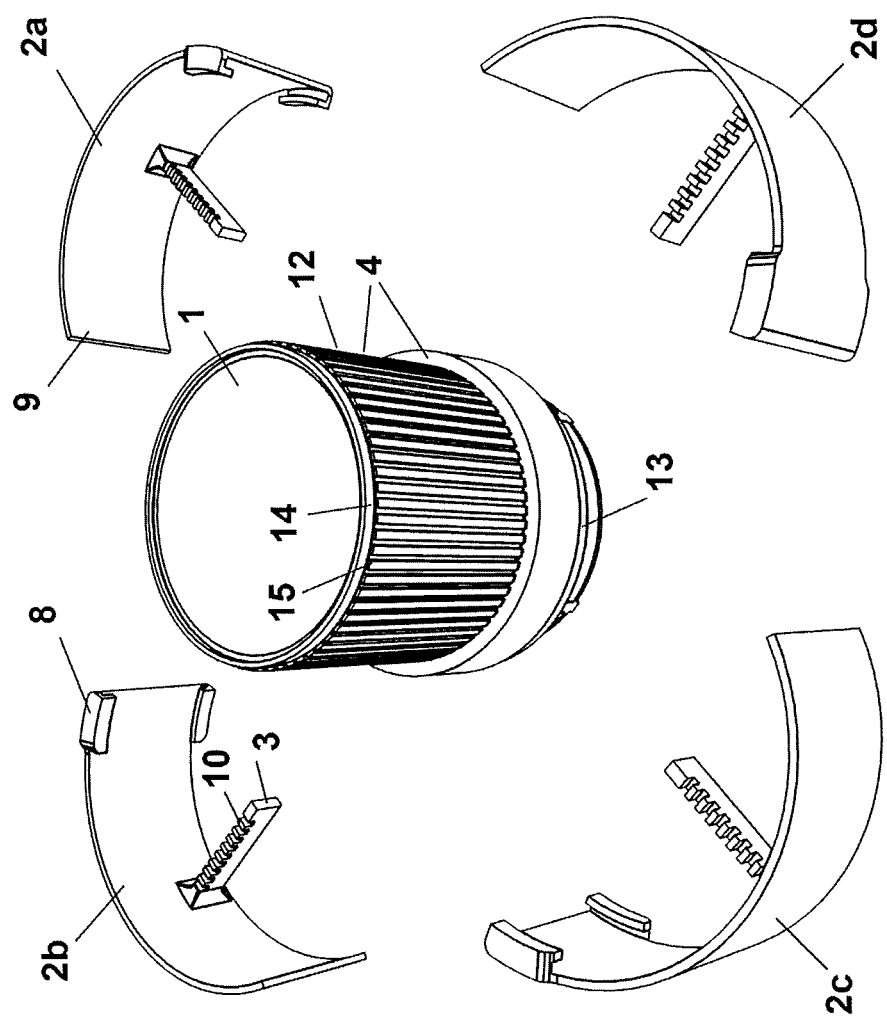
Figure 12:
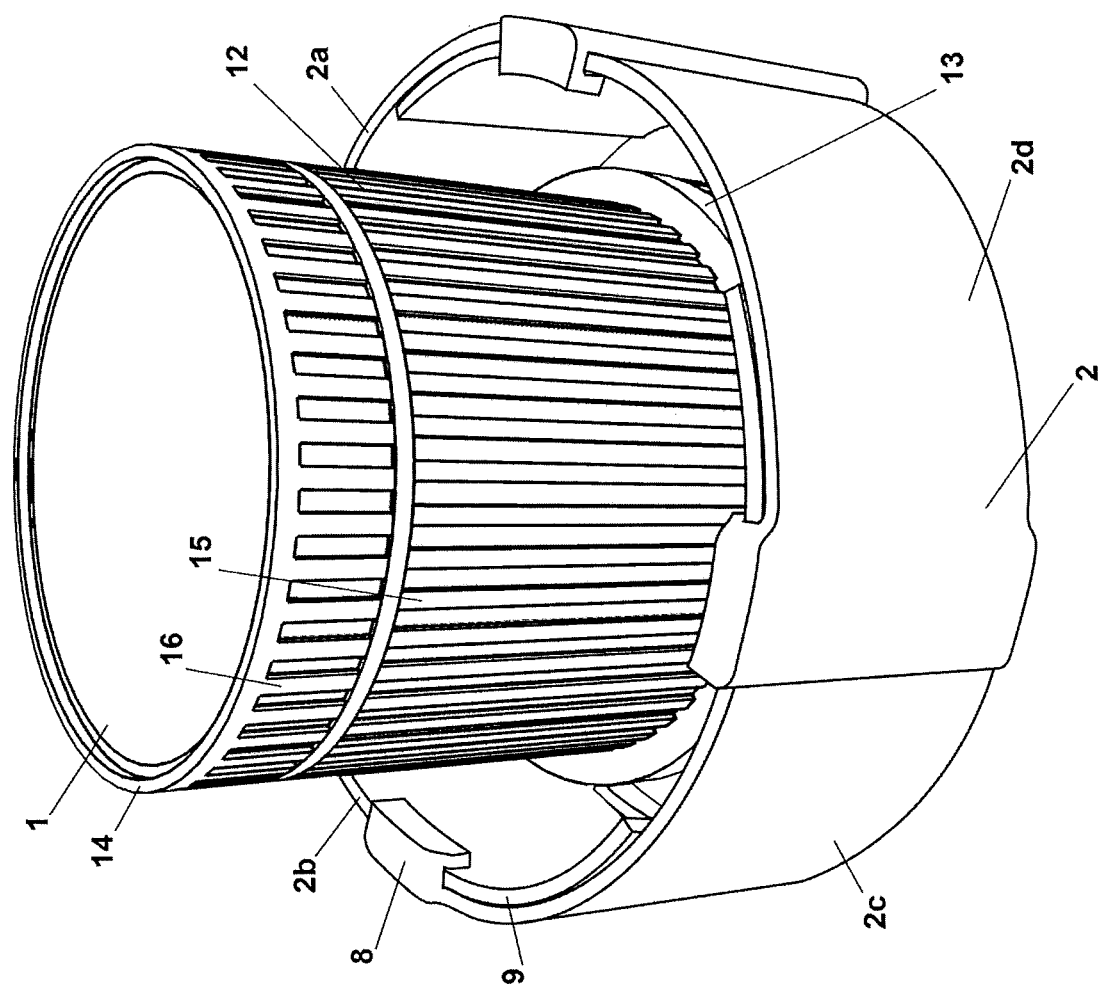
Figure 13:
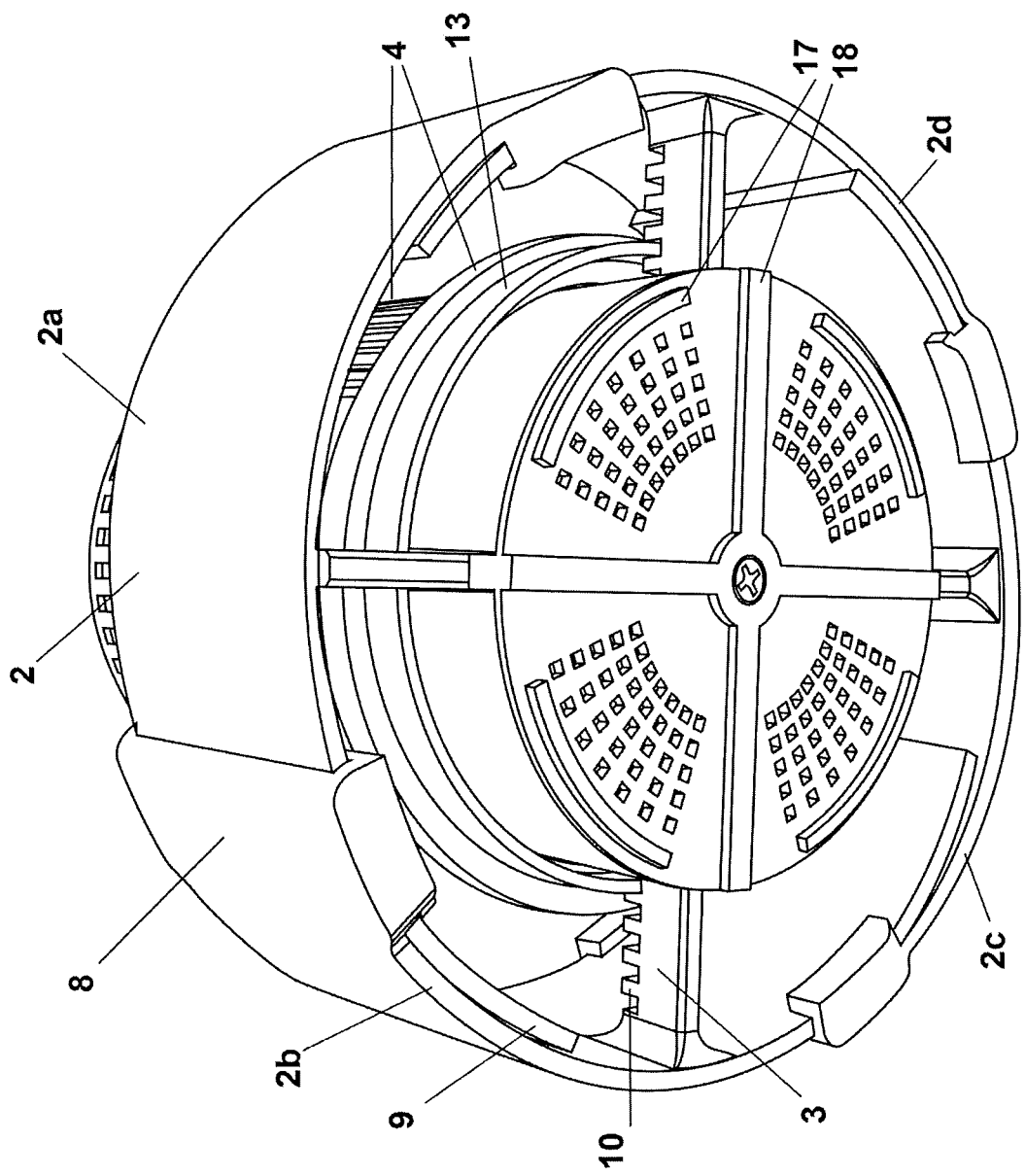
Figure 14:
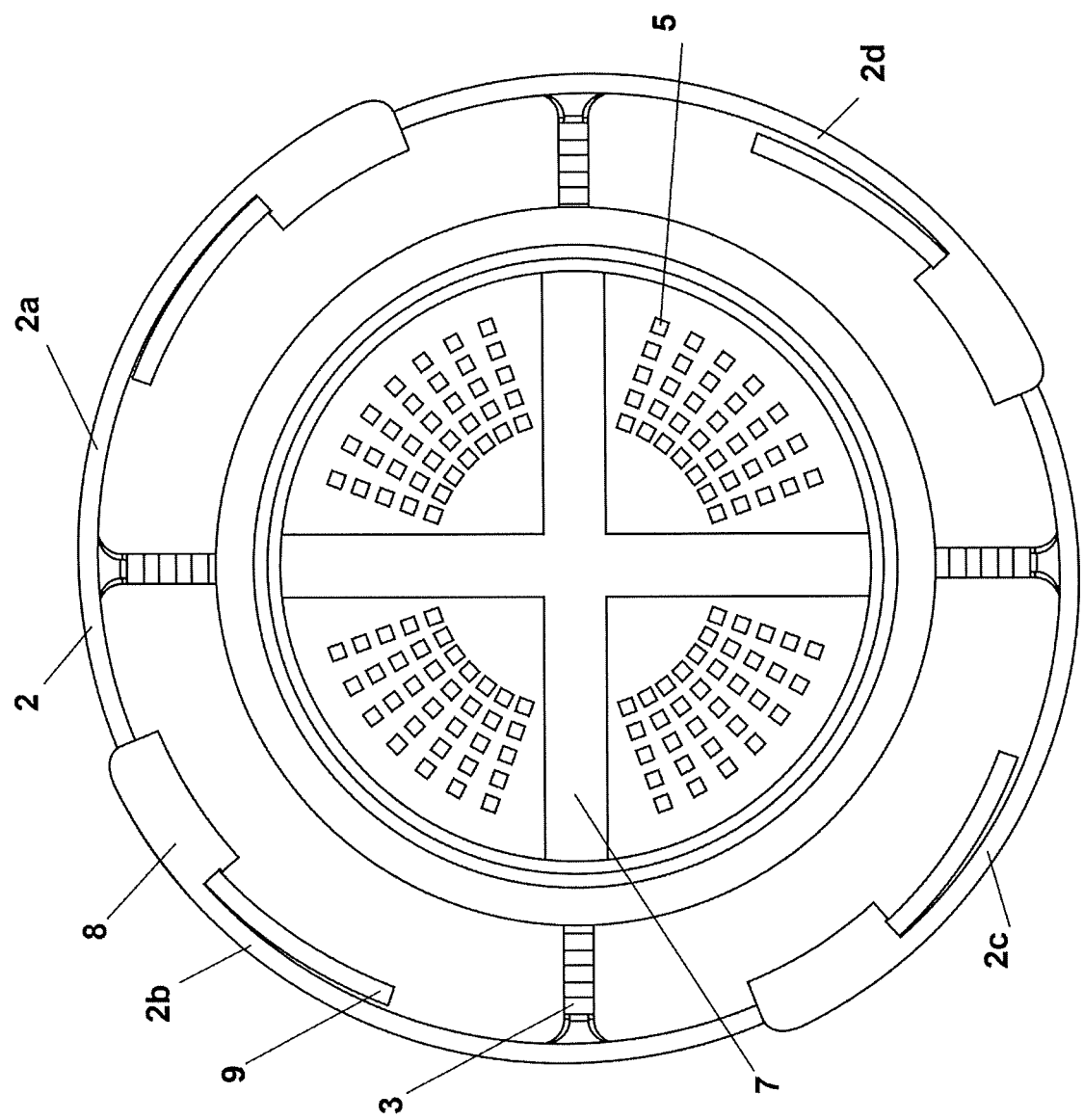
Figure 15:
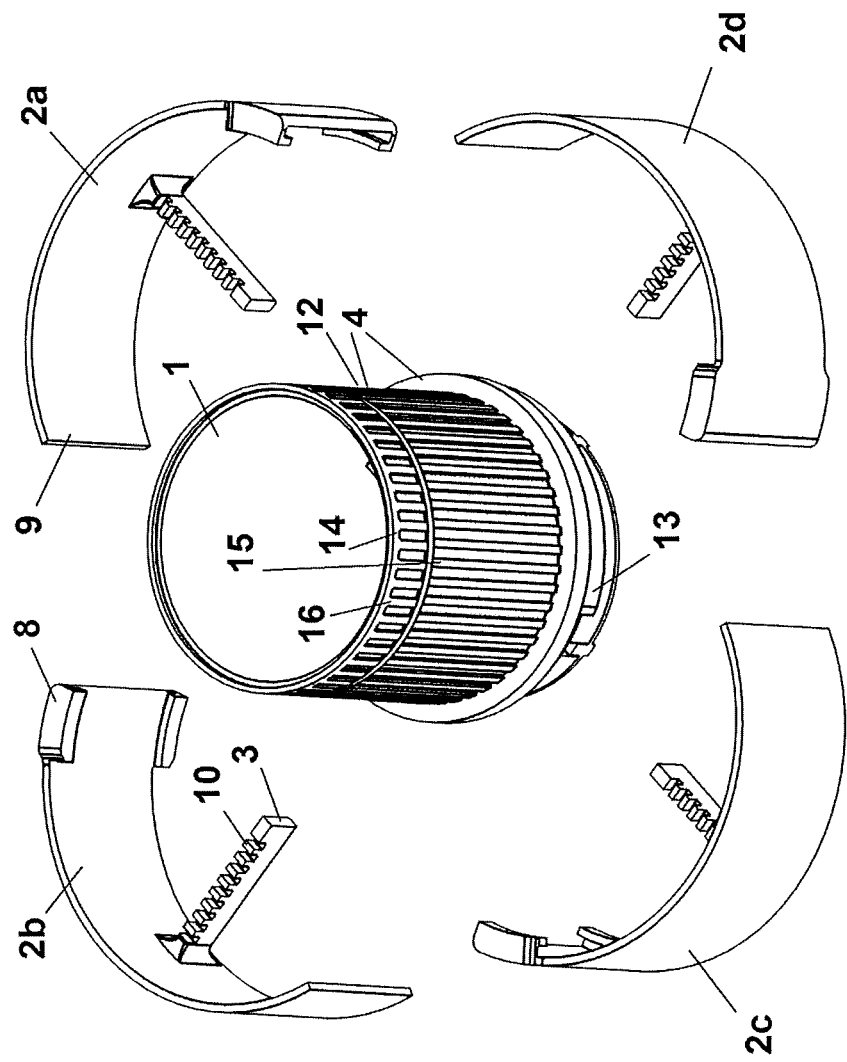
Figure 16:
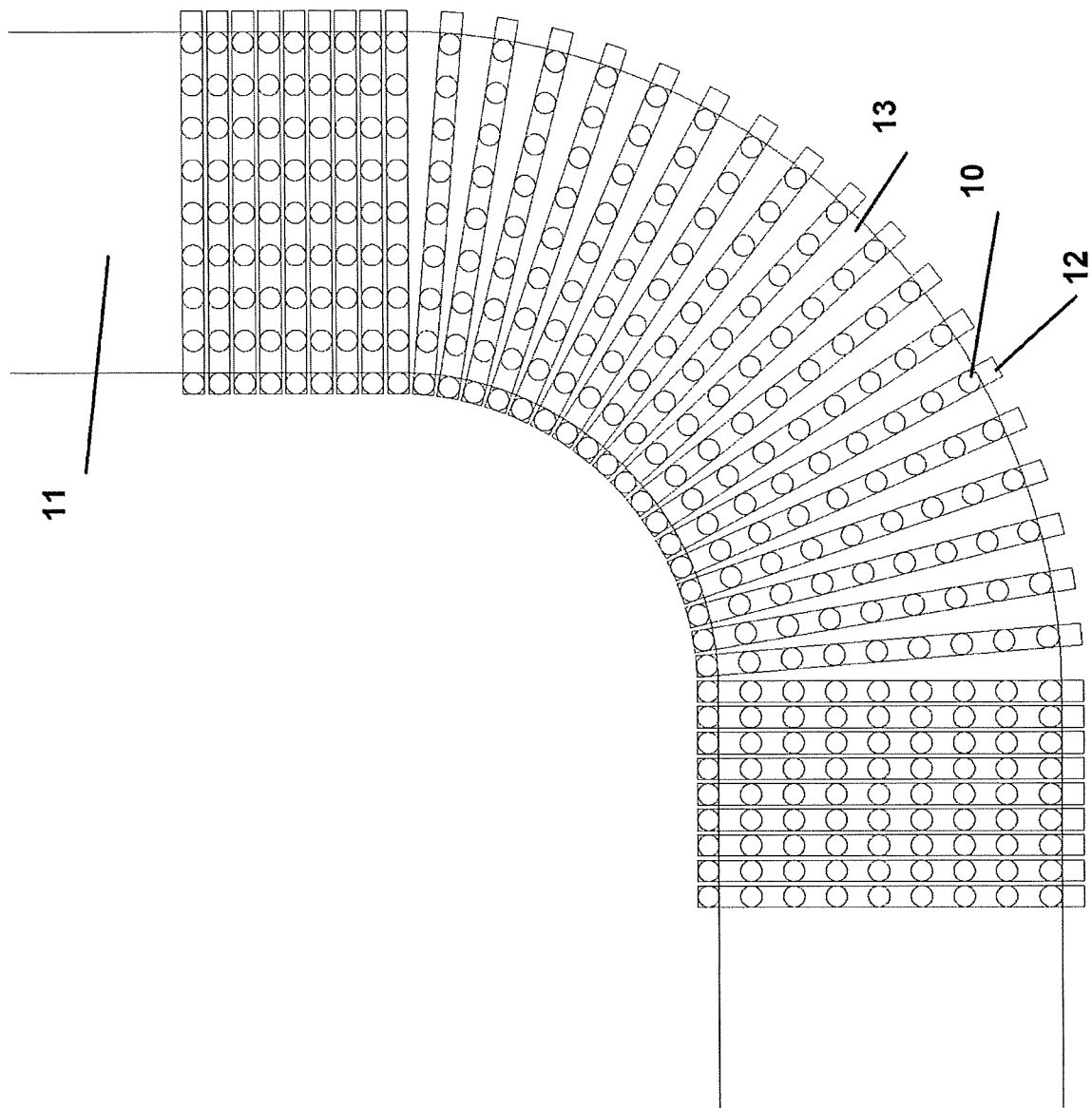
Figure 17:
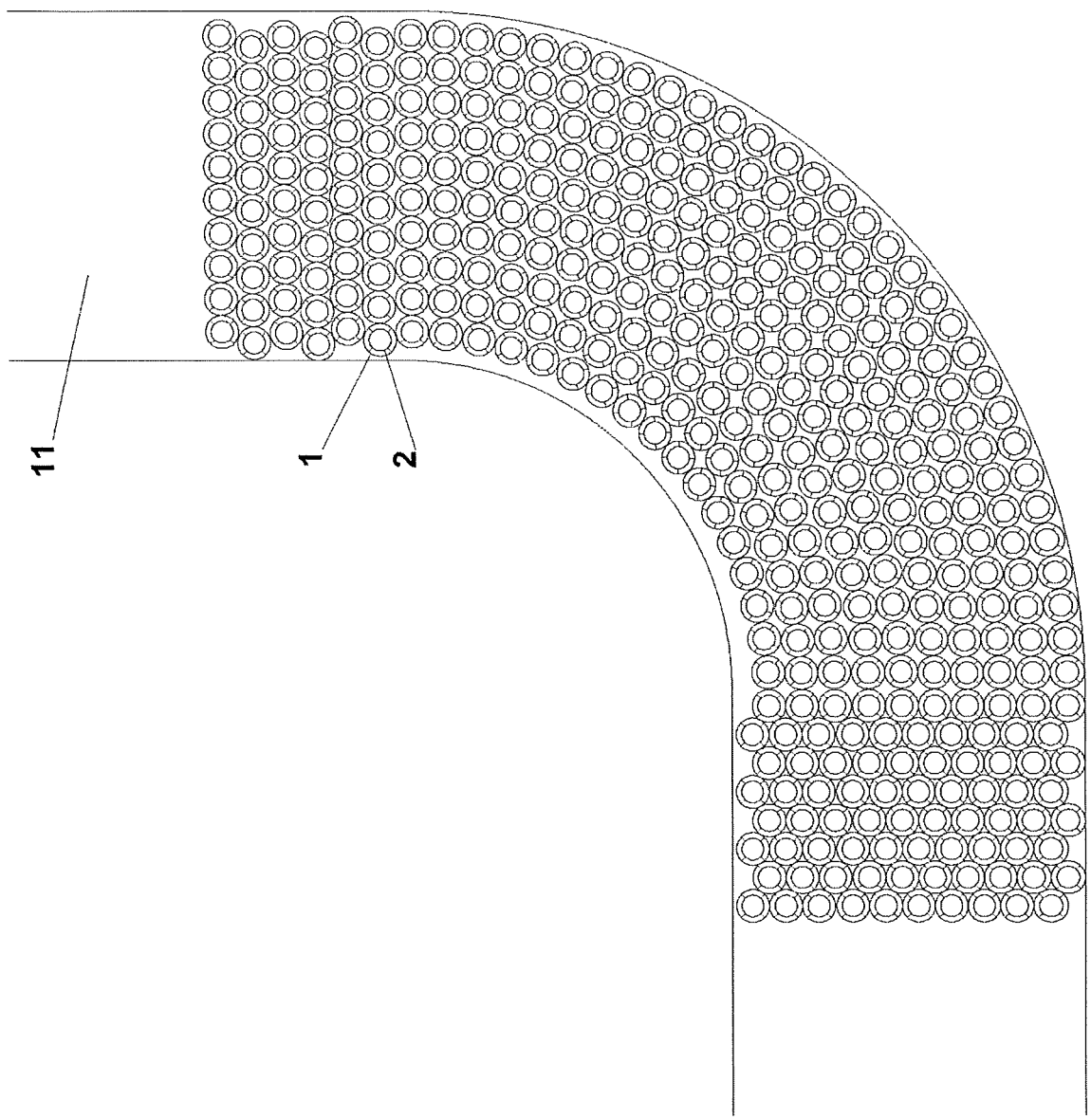
Figure 18:
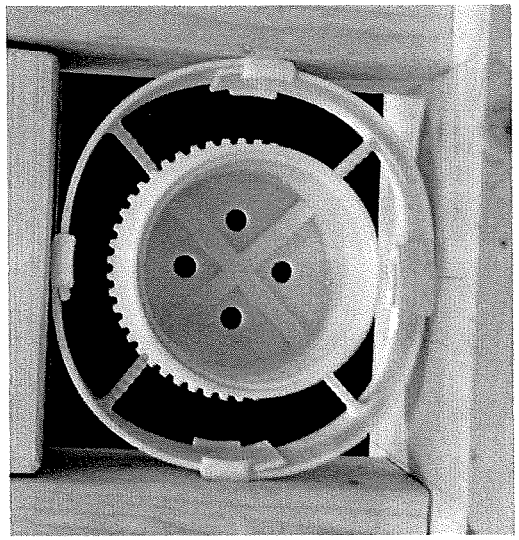
Figure 18:
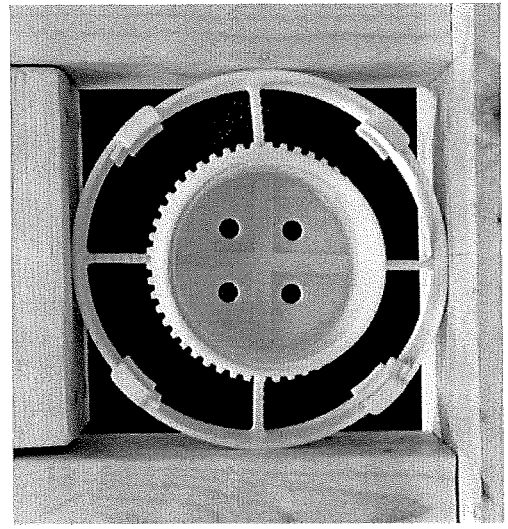
Figure 18:
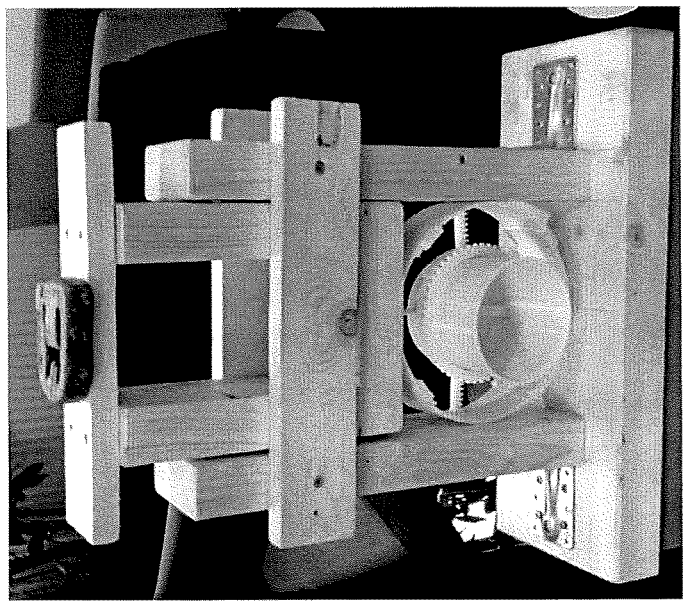

FIG. 1 shows a side view of Example 1.
FIG. 2 shows a top view of the device in FIG. 1.
FIG. 3 shows a perspective view of the device in FIG. 1.
FIG. 4 shows a perspective view of Example 2.
FIG. 5 shows a view from above of Example 2.
FIG. 6 shows a perspective view of Example 3.
FIG. 7 shows a view from above of Example 3.
FIG. 8 shows a perspective view of Example 4.
FIG. 9 shows a perspective view of Example 4 from beneath.
FIG. 10 shows a view from above of Example 4.
FIG. 11 shows a perspective view of Example 4 wherein the sections of the frame have been separated from the pot and locking means.
FIG. 12 shows a perspective view of Example 5.
FIG. 13 shows a perspective view of Example 5 from beneath.
FIG. 14 shows a view from above of Example 5.
FIG. 15 shows a perspective view of Example 5 wherein the sections of the frame have been separated from the pot and locking means.
FIG. 16 illustrates a top view of a prior art conveying method wherein a plurality of pots are placed in trays.
FIG. 17 illustrates a top view of pot devices according the present invention in a conveying system.
FIG. 18 a-c illustrated a load test.

DETAILED DESCRIPTION OF THE INVENTION

EXAMPLE 1

Referring to FIGS. 1-3 of the drawings there is illustrated a specific example of a pot device having an external frame (2) for holding a pot (1) inside the frame. As indicated in the figures, the frame is formed as a closed loop which is circular in shape. The closed loop prevents pot devices from getting entangled with each other and the circular shape of the frame provides stability in all direction. The lower end of the frame constitutes a support base which is in contact with the ground and offers support for the pot device.

As illustrated in FIG. 2, the frame comprises two sections (2a and 2b) that are connected to each other, which facilitates the adjustment of the frame in a horizontal plane. Moreover, the sections are telescopically connected to each other in the circumferential direction which provides simple means of moving the sections against or away from each other in order to adjust the diameter of the frame. Hence, the diameter of the frame can be increased and decreased depending on the width of the plants part protruding from the plant. The variable adjustment of the diameter of the frame can be attained by using winding, sliding, screwing, adhesion, bolt, string, wire, belt and/or clamp arrangements placed between the sections.

The pot device further comprises four connection units (3) wherein each unit has locking means (4) for stably and securely connecting the frame to the pot. Additionally, the connection units may be length adjustable in order to provide the pot device with means for holding either (i) pots of different sizes, or (ii) pots which have adjustable diameters. The length adjustable connection units may be made by various ways which are trivial to the skilled person in the art.

As indicated in FIGS. 1-3, the pot may have a wider diameter at the rim (1a) than at the base (1b) of the pot. Moreover, the pot may include drainage holes that has at least one opening (5) at the base of the pot. Hence, if the user over-waters the plant in the pot with water or nutrient solution, or rain causes the pot to become over-saturated with water, the drainage holes allows excess water to exit the pot in order to allow an appropriate degree of moisture and nutrients in the pot for better growth of plants. The excess water may be collected in a container (6) which is placed underneath the pot (1).

EXAMPLE 2

The embodiment according to example 2 comprises (see FIGS. 4 and 5):
A pot (1) comprising four channels (7) at the lower end wherein each channel can accept the full length of the connection units (3),
A frame (2) comprising four sections (2a, 2b, 2c and 2d) wherein each section further comprises a perpendicular connection unit (3) which is preferably centered in the horizontal direction of the frame, and
A locking means (4) formed as a cylindrical circular ring, wherein the pot is enveloped by said ring i.e. the pot is inside of the ring but not necessarily in contact with the ring The pot comprises a base portion comprising four channels (7) which extend outwardly from the center of the pot. Each one of said channel extends in a different direction and at an angle 90 degrees (i.e. perpendicular) with respect to the two closest channels, i.e. they are designed to fit the perpendicular connection units. Moreover, the channels have the length and breadth to stably receive the connection unit of the sections, i.e. the channels and their corresponding connection units are dimensioned to fit each other as well as to give a stable support. Additionally, the pot has one or more drainage holes (5) at the base of the pot, preferably centered in between the channels.

The frame (2) comprises four sections (2a-2d) that are telescopically connected to each other. Each of the sections comprises a clamp (8) at one end, and a flap (9) at the other end, wherein each section is designed to clamp the flaps of the adjacent section. This is illustrated in FIGS. 4 and 5 wherein the frame (2) comprises four sections (2a-2d) that are telescopically connected to each other by clamps (8) and flaps (9).

The pot device further comprises a locking means (4) formed as cylindrical ring which has a diameter bigger than the pot but smaller than the minimum diameter of the frame. The locking means and the connection units together constitute the connection means. The upper end (10) of the connection units (3) is preferably formed as a saw-tooth, i.e. the upper end has a toothed, jagged and/or zigzag pattern or profile. The saw-tooth profile enables the locking means (4) to stably and securely connect with the connection units (3), and thereby connecting and locking the frame (2) to the pot (1). The term toothed is in this context defined as a having rectangular, quadratic, triangular and/or trapezoid shaped projections or indentations on the top surface of the connection units.

The lower end of the locking means is designed to fit the saw-tooth profile (or any other profile) of the connection units. The upper end of the locking means preferably comprises a circumferentially extending handle (11) wherein said handle is perpendicular to the part of the locking means that fits with the connection units. The handle provides means for a person or a device to lift and/or press down the locking means.

The variable adjustment of the diameter of the frame is attained by lifting the locking means (4) and thereafter pulling the sections outwards away from the pot in all directions, while optionally, simultaneously from below pushing the connection units (3) outwards from the center of the pot. However, if the saw-tooth profile is zigzag or triangular as illustrated in FIG. 4, then it is only necessary to lift the ring with external means (person or device) when the diameter of the ring is to be decreased, i.e. it not necessary to lift the ring when the diameter of the frame is to be increased. Consequently, the ring is lifted by top of the zigzag saw-tooth profile and then the ring falls into place when the top of the zigzag saw-tooth profile passes the ring. Zigzag is in this context defined as a line, course, or progression characterized by sharp turns first to one side and then to the other.

The rim of the pot (1) preferably comprises an integrated handle (14) which has a part which is perpendicular to the vertical wall of the pot and a part which is parallel with the vertical wall of the pot (or alternatively parallel with the wall of the frame).

The frame can be adjusted to obtain a diameter within the interval of 5-100 cm, preferably 10-50 cm, more preferably 13.5 to 20.5 cm. The diameter of the pot device is dependent on the size of the pot since the size of the pot determines the maximum length of the connection units which then determines how far out the sections can be moved.

The edge (8a) the clamp (8) which is on the outer part of the frame is sharp in the embodiment for example 2 as illustrated in FIG. 5. However, the edge can also be rounded as illustrated in the embodiment in example 3 as illustrated in FIG. 7 (8b). The rounded shape provides better means for the pot device not to get entangled with other pots when being transported in a conveyor system or any other means of transport.

EXAMPLE 3

The preferred embodiment according to example 3 comprises (see FIGS. 6 and 7):
  A pot (1) comprising four channels (7) at the lower end wherein each channel can accept the full length of the connection units (3),
  A frame (2) comprising four sections (2a-2d) wherein each section further comprises a perpendicular connection unit (3) which is preferably centered in the frame in the horizontal direction, and
  A locking means (4) formed as a cylindrical circular ring, wherein the pot is enveloped by said ring (i.e. the pot is inside of the ring) but not necessarily in contact with the ring.

The pot comprises a base portion comprising four channels (7) which extend outwardly from the center of the pot. Each one of said channel extends in a different direction and at an angle 90 degrees with respect to the two closest channels, i.e. they are designed to fit the perpendicular connection units. Moreover, the channels have the length and breadth to stably receive the connection unit of the sections, i.e. the channels and their corresponding connection units are dimensioned to fit each other as well as to give a stable support. Additionally, the pot has one or more drainage holes (5) at the base of the pot, preferably centered in between the channels.

The frame (2) comprises four sections (2a-2d) that are telescopically connected to each other. Each of the sections comprises a clamp (8) at one end, and a flap (9) at the other end, wherein each section is designed to clamp the flaps of the adjacent section. This is illustrated in FIGS. 6 and 7 wherein the frame comprises four sections (2a-2d) that are telescopically connected to each other by clamps (8) and flaps (9).

The pot device further comprises a locking means (4) formed as cylindrical ring which has a diameter bigger than the pot but smaller than the minimum diameter of the frame. The locking means (4) and the connection units (3) together form the connection means. The upper end (10) of the connection units is preferably formed as a saw-tooth, i.e. the upper end has a toothed, jagged, triangular and/or zigzag pattern or profile. The saw-tooth profile enables the locking means (4) to stably and securely connect with the connection units (3), and thereby connecting and locking the frame (2) to the pot (1).

Furthermore, the locking means (4) is designed as one turn of a screw thread and the connection units are designed as sections of a screw thread. Consequently, variable adjustment of the diameter of the frame is attained by turning the locking means around the pot which results in the connection unit being variably pushed (i.e. screwed) outwards or inwards from the channels of the pot. If the pitch of the thread is small then several turns of rotation will be needed; however, on the other hand, the connecting forces between the locking means and the connection unit becomes more stable, i.e. the connection means can't unscrew itself as easily.

The frame can be adjusted to obtain a diameter within the interval of 5-100 cm, preferably 10-50 cm, more preferably 13.5 to 20.5 cm. The diameter of the pot device is dependent on the size of the pot since the size of the pot determines the maximum length of the connection units which then determines how far out the sections can be moved.

The upper end of the locking means comprises a circumferentially extending handle (11) wherein said handle is perpendicular to the part of the locking means (4) that locks the connection units (3) and wherein said handle (11) provides means for a person or a device to turn the locking means (4). Preferably, the handle has a saw-tooth profile in order to facilitate gripping and then turning the locking means in either direction.

The rim of the pot (1) preferably comprises an integrated handle (14) which has a part which is perpendicular to the vertical wall of the pot and a part which is parallel with the vertical wall of the pot (or alternatively parallel with the wall of the frame).

EXAMPLE 4

The preferred embodiment according to example 4 comprises (see FIGS. 8-11):
  A pot (1) comprising four channels (7) wherein each channel can accept the full length of the connection units (3),
  A frame (2) comprising four sections (2a-2d) wherein each section further comprises a perpendicular connection unit (3) which is preferably centered in the frame in the horizontal direction,
  A locking means (4) comprising
    a cylindrical sleeve (12) which the pot is placed in, and
    a cylindrical circular ring (13) integrated with said cylindrical sleeve (12)

The pot comprises a base portion comprising four channels (7) which extend outwardly from the center of the pot. Each one of said channel extends in a different direction and at an angle 90 degrees with respect to the two closest channels, i.e. they are designed to fit the perpendicular connect units (3). Moreover, the channels have the length and breadth to stably receive the connection unit of the sections, i.e. the channels and their corresponding connection units are dimensioned to fit each other as well as to give a stable support. Additionally, the pot has one or more drainage holes (5) at the base of the pot, preferably centered in between the channels.

The frame comprises (2) four sections (2a-2d) that are telescopically connected to each other. Each of the sections comprises a clamp (8) at one end, and a flap (9) at the other end, wherein each section is designed to clamp the flaps of the adjacent section. This is illustrated in FIGS. 8-11 wherein the frame comprises four sections (2a-2d) that are telescopically connected to each other by clamps (8) and flaps (9).

The pot (1) is fitted in a cylindrical sleeve (12) wherein said cylindrical sleeve comprises an integrated cylindrical circular ring (13) which is preferably situated at the bottom end of the sleeve. The cylindrical sleeve (12) and the integrated ring (13) constitute the locking means (4). The integrated ring (13) is arranged on the sleeve so that it can be in contact with the connection units (3). The pot and the cylindrical sleeve are proportioned so that they are fitting each other; however the cylindrical sleeve is also able to turn around the pot. It should be noted that the definition of sleeve in the context of the present invention is meant to be a case into which an object or device fits.

The rim of the pot (1) preferably comprises an integrated handle (14) which has a part which is perpendicular to the vertical wall of the pot and a part which is parallel with the vertical wall of the pot (or alternatively parallel with the wall of the frame). The handle (14) has a preferably vertical length of 0.3 to 5 cm. The handle is used for:

pushing the pot into the cylindrical sleeve, and
keeping the sleeve from sliding off the pot in the vertical upward direction, and
holding the pot while turning the sleeve around the pot.

The ring (13) of the locking means (4) has a diameter bigger than the pot but smaller than the minimum diameter of the frame. The locking means (4) and the connection units (3) constitute the connection means. The upper end of the connection units is preferably formed as a saw-tooth, i.e. the upper end has a toothed, jagged, triangular and/or zigzag pattern or profile. The saw-tooth profile enables the locking means (4) to stably and securely connect with the connection units, and thereby connecting and locking the frame (2) to the pot (1). Consequently, the lower end of the locking means (4) is designed to fit the saw-tooth profile of the connection units.

Furthermore, the integrated ring (13) of the locking means (4) is designed as one turn of a screw thread and the connection units (3) are designed as sections of a screw thread. Consequently, variable adjustment of the diameter of the frame is attained by turning the locking means around the pot which results in the connection unit being variably pushed (i.e. screwed) outwards or inwards from the channels of the pot. If the pitch of the thread is small then several turns of rotation will be needed; however, on the other hand, the connecting forces between the locking means and the connection unit becomes more stable, i.e. the connection means can't unscrew itself as easily.

The cylindrical sleeve (12) of the locking means preferably comprises a plurality of ribs (15) on the outer surface which facilitate supporting, gripping and turning of the locking means. The definition of ribs in this context is long raised pieces of material across the surface of a structure and typically serving to support and/or strengthen the structure. The ribs can be of the same material as the rest of the locking means, or alternatively, a stronger or thicker material to strengthen the locking means.

The embodiment in example 4 differs from the embodiments in examples 1-3 in that the bottom part of the pot is preferably removable to facilitate the mounting of the pot with the connection units. It is not possible to lift the cylindrical ring (13) since it is integrated with the cylindrical sleeve; hence, the most optimal way of inserting the connection units into the channels of the pot is to remove the bottom of the pot. The bottom part of the pot is therefore removably fastened to the pot by a screw or other means in the art. Moreover, the bottom part of the pot preferably comprises ribs (18) on both sides for (i) supporting the bottom part of the pot when the pot device is placed on a surface, and (ii) supporting the connection units. The ribs are parallel with the channels (7).

The frame can be adjusted to obtain a diameter within the interval of 5-100 cm, preferably 10-50 cm, more preferably 13.5 to 20.5 cm. The diameter of the pot device is dependent on the size of the pot since the size of the pot determines the maximum length of the connection units which then determines how far out the sections can be moved.

EXAMPLE 5

The preferred embodiment according to Example 5 differs from the preferred embodiment according to Example 4 mainly in that the handle (14) comprises ribs (15) in order to give a more effective means of gripping the handle (see FIGS. 12-15). Consequently, when the locking means is to be turned one can more easily hold the handle and subsequently turn the handle and locking means in opposite directions to increase the diameter of the frame. Additionally, the pot device preferably comprises a plurality of ribs (17) which are parallel with the circumference of the bottom part of the pot. The plurality of ribs (17) is preferably four ribs and is placed in between ribs (18).

Reference is now made to FIG. 16 which is illustrative of a prior art embodiment of arranging pots (10) on a conveyor system (11). The pots are placed in trays (12), and due to this feature, there is unused space (13) created between the trays, especially in the curves. Moreover, in order to provide optimal amount of light, the distance between the trays has to be increased as the plants grow. However, the distance between the plants within a tray cannot be adjusted to the size of the plants due to the lack of space; hence, the pots have to be taken out from the trays and placed in empty trays in order to provide optimal amount of light for the plants.

An arrangement according to the invention is shown in FIG. 17 wherein a plurality of pot devices according to the present invention is spaced side by side on a conveyor system. Hence, there is minimal empty space between the pot devices, especially in the curves. Additionally, the diameter of the frame (2) connected to the pot (1) can be increased in order to (i) maximize the effective use of the growing space and provide optimum spacing for the plants to receive optimal amount if light, (ii) achieve higher stability, and (iii) hinder protruding plant parts from colliding with each other.

The conveyor systems in FIG. 17 can be any system where pot devices are being moved from one point to another such as a conveyor belt or transporter. More preferably, the conveying system is a system wherein the pot device according to the invention is placed on a surface which does not move and wherein the pots are instead being transported forwards by a mechanical device which is collectively pushing the pot devices over said surface. The load exerted on each of the pot device is therefore very large; however, the pot devices are able to withstand this load mainly due to the cylindrical ring of the locking means. As, already indicated earlier in the present invention, the locking means does not only function as a means for locking the connection units in place, but it also functions as a stress, load and force absorbing means.

Although FIG. 17 relates to pot devices placed on a conveyor systems, it is intended to be illustrative only. The pot devices may also be placed on tables, decks, racks, platforms, floor, ground, vehicles, and/or any other structure where plants are grown in pots and there is a need for (i) maximizing the effective use of the growing space and provide optimum spacing for the plants, (ii) achieving higher stability, and (iii) hindering protruding plant parts from colliding with each other, and (iv) enabling the pot device to withstand large loads The pot device according to the present invention is utilized in agriculture, horticulture, farming, as well as greenhouses. Preferably, the pot device is used in large scale and commercial agriculture, horticulture, farming, as well as greenhouses.

The pot device according to the present invention can be made from various materials. It can be made from plastic, clay, or any other suitable material. One of ordinary skill in the art will understand that various other materials can be used to produce the pot device. The various materials can be used to meet a variety of weight, climate, aesthetic, or other considerations, and a change in the device's material components does not affect the utility or use of the pot device The pot device according to the present invention can be made in a variety of sizes. One of ordinary skill in the art will understand that a variety of sizes are possible without compromising the utility of the pot device.

The pot device according to the present invention can be deployed on any terrain where pots for growing plants are commonly used, including sidewalks, earth, sand, balconies, wooden decks, conveying belts etc.

The pot device according to the present invention can deployed indoors, outdoors, and to a variety of "in-between" areas such as gazebos, partial enclosures, balconies, canopied decks etc. One of ordinary skill in the art will understand that there are a variety of places where the pot device according to the present invention can be deployed.

While the pot device according to the present invention has been described with reference to the above specific example in FIGS. 1-15, which is intended to be illustrative only and not to be limiting of the disclosure, it is noted that changes, additions and/or deletions may be made to the disclosed example without departing from the spirit and scope of the disclosure. The scope of the disclosure is therefore not covered by any specific example, but rather by the claims.

Load Tests

Since the pot device according to the present invention is suitable for use in environments, such as conveyor systems, where large loads are to be exerted on the pot device, it is important to determine the loads that can be managed by the pot devices.

A test rig according to FIG. 18a was developed to exert a load to a pot device in a manner similar to the expected load when a pot device is used in conveying systems such as the one illustrated in FIG. 17.

The term load in the present invention is defined as forces, deformations, or accelerations applied to a structure or its components. Loads cause stresses, deformations, and displacements in structures. Assessment of their effects is carried out by methods such as load tests. Excess load or overloading may cause structural failure, and hence such possibility should be either considered in the design or strictly controlled.

The above mentioned test rig comprises a first wooden board placed on a surface, and second and third wooden boards which are perpendicularly attached to the edges of the first wooden board so that the all of the wooden boards are in contact with the frame of the pot device. A fourth wooden board is then from the top placed on the frame so that the fourth and first wooden boards are parallel with each other. The fourth wooden board is supported by (i) fifth and sixth wooden boards which are perpendicularly attached to the edges of the fourth wooden board, as well as a (ii) seventh wooden board attached to the fifth and sixth wooden boards.

The load test was conducted when the pot device had the largest possible diameter. Load was exerted on the frame of the pot device by placing weights on the seventh wooden board. The first load had a weight of 3 kg which was subsequently increased to 4.8 kg, 6.6 kg, 7.7 kg and 10.6 kg.

The load was tested both when (i) the connection units of the sections were perpendicular to boards at the point of contact between the board and frame as indicated in FIG. 18b, and (ii) the clamps of the sections were perpendicular to boards at the point of contact between the boards and the frame as indicated in FIG. 18c.

The final tests were conducted by conducting the load test with a 10.6 kg weight for 3 days.

The load test indicated that the pot devices managed to bear the exerted loads. A slight deformation was observed after the 3 day test with the 10.6 kg load, however, the deformation disappeared after a short while. More importantly, neither the telescopic function of the sections, nor the variable adjustment of the diameter of the frame, was affected after the load tests.

The invention claimed is:

1. A pot device having an external frame for holding a pot inside the frame, wherein
said frame comprises a lower end constituting a support base,
said pot device comprises a connection arrangement arranged for connecting the frame to the pot,
an extension of the frame in a horizontal plane is variably adjustable,
the frame is formed as a closed loop in a horizontal plane,
the frame includes a plurality of circumferentially distributed sections,
the circumferentially distributed sections are telescopically connected to each other in the circumferential direction to form said closed loop,
the connection arrangement comprises a locking device and a plurality of connection units,
the locking device is arranged to engage with the connection units to stably and securely connect the frame to the pot,
each of the connection units is perpendicularly attached to a respective section of the plurality of circumferentially distributed sections such that said connection units extend inwardly in said closed loop,
part of the locking device in contact with the connection units is designed as one turn of a screw thread and parts of the connection units in contact with the locking device are designed as sections of a screw thread, and
the variable adjustment of the extension of the frame is enabled by turning the locking device around the pot which results in the connection unit being variably screwed outwards or inwards out of channels of the pot which results in the sections being moved outwards or inwards, respectively.

2. The pot device according to claim 1, wherein the closed loop is substantially circular.

3. The pot device according to claim 1, wherein the pot device comprises at least two circumferentially distributed sections.

4. The pot device according to claim 1, wherein the pot device comprises four circumferentially distributed sections.

5. The pot device according to claim 1, wherein each of the circumferentially distributed sections comprises a clamp at one end and a flap at the other end, and wherein each section is designed to clamp the flaps of the adjacent section.

6. The pot device according to claim 1, wherein the connection arrangement comprises four connection units.

7. The pot device according to claim 1, wherein the locking device comprises a cylindrical circular ring arranged to be (i) in between the pot and the frame, and (ii) in contact with the connection units.

8. The pot device according to claim 7, wherein the locking device further comprises a cylindrical sleeve adapted to receive the pot therein, wherein said cylindrical circular ring is integrated with said cylindrical sleeve, and wherein said cylindrical circular ring is arranged on the sleeve so that said cylindrical circular ring is in contact with the connection units.

9. The pot device according to claim 8, wherein the sleeve comprises ribs on the outer surface.

10. The pot device according to claim 7, wherein the upper end of the locking device comprises a circumferentially extending handle, and wherein said handle is perpendicular to the part of the locking device that fits with the connection units.

11. The pot device according to claim 1, wherein the upper end of the connection units comprises a saw-tooth profile, and wherein a lower end of said locking device is designed to fit said saw tooth profile, such that the locking device connects with the connection units.

12. The pot device according to claim 11, wherein the saw-tooth profile at the upper end of the connection units comprises a toothed, jagged and/or zigzag profile, and wherein said toothed profile is a rectangular, quadratic, triangular and/or trapezoid shaped projections or indentations on the upper end of the connection units.

13. A pot arrangement comprising a pot device according to claim 1 and a pot.

14. The pot arrangement according to claim 13, wherein a rim of the pot comprises a handle.

15. The pot arrangement according to claim 13, wherein said pot comprises a plurality of channels at the lower end of the pot, and wherein said channels have a length and a width to receive the connection units of the sections of the pot device.

16. The pot arrangement according to claim 15, wherein the number of said channels at the lower end of the pot is four, said channels extending outwardly from the center of the pot, and wherein each channel is perpendicular relative to the two closest channels.

17. The pot device according to claim 1, wherein the turning of the locking device, and the connection units consequently being screwed outwards or inwards, is enabled by an electromagnetic or electrical device included in the pot device.

18. The pot device according to claim 1, wherein the upper end of the locking device comprises a circumferentially extending handle, wherein said handle is perpendicular to the part of the locking device that locks the connection units, and wherein said handle provides means for a person or a device to turn the locking device.

19. A method of variably adjusting the horizontal extension of a frame of a pot device according to claim 1, said method comprising:
moving the sections outwards, away from the center of the pot, wherein the horizontal extension of the frame is increased, or
moving the sections inwards, towards the center of the pot, wherein the horizontal extension of the frame is decreased, and
wherein said moving involves directly or indirectly pushing, pulling and/or screwing of the connection units and/or sections, and
turning the locking device around the pot which results in the connection unit being variably screwed outwards or inwards out of channels of the pot which results in the sections being moved outwards or inwards, respectively.

20. The method according to claim 19, wherein the turning of the locking device is enabled by an electromagnetic or electrical device included in the pot device.

21. The method according to claim 19, wherein
moving the sections outwards comprises lifting the locking device prior to moving the sections outwards, wherein said moving comprises pulling the sections outwards, away from the center of the pot, and wherein moving the sections inwards comprises lifting the locking device prior to moving the sections inwards, and wherein said moving comprises pushing the sections inwards, towards the center of the pot.

22. The method according to claim 21, wherein moving the sections outwards comprises, from below of the pot devise, simultaneously pulling each of the connection units outwards from the center of the pot, and
wherein moving the sections inwards comprises, from below of the pot device, simultaneously pushing each of the connection units inwards towards the center of the pot.

* * * * *